(12) United States Patent
Tagomori

(10) Patent No.: US 12,346,439 B2
(45) Date of Patent: *Jul. 1, 2025

(54) INSPECTION SYSTEM, INSPECTION METHOD, AND COMPUTER PROGRAM

(71) Applicant: NOMURA RESEARCH INSTITUTE, LTD., Toyko (JP)

(72) Inventor: Teruhiro Tagomori, Tokyo (JP)

(73) Assignee: Nomura Research Institute, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,697

(22) Filed: Jul. 13, 2023

(65) Prior Publication Data

US 2023/0359735 A1 Nov. 9, 2023

Related U.S. Application Data

(63) Continuation of application No. 17/354,481, filed on Jun. 22, 2021, now Pat. No. 11,741,229, which is a
(Continued)

(30) Foreign Application Priority Data

Apr. 3, 2017 (JP) .................................. 2017-073830

(51) Int. Cl.
G06F 21/56 (2013.01)
H04L 9/40 (2022.01)

(52) U.S. Cl.
CPC .......... *G06F 21/561* (2013.01); *H04L 63/145* (2013.01); *G06F 2221/034* (2013.01)

(58) Field of Classification Search
None
See application file for complete search history.

(56) References Cited

U.S. PATENT DOCUMENTS 10,063,572 B2 * 8/2018 Milazzo .............. H04L 63/1416
10,972,281 B2 * 4/2021 Scott ..................... H04L 9/0891
(Continued)

FOREIGN PATENT DOCUMENTS

| CN | 101399553 A | 4/2009 |
|---|---|---|
| JP | 2005182335 A | 7/2005 |
| JP | 2017-21779 A | 1/2017 |

OTHER PUBLICATIONS

First Review of the Opinion Notice issued in corresponding Chinese Application No. 2018800214365, dated Nov. 18, 2022, (8 pages) with English translation (4 pages).
International Preliminary Report on Patentability for Application No. PCT/JP2018/014256, including English translation, dated Oct. 8, 2019, 14 pages.
(Continued)

*Primary Examiner* — Brandon Hoffman
(74) *Attorney, Agent, or Firm* — Crowell & Moring LLP

(57) ABSTRACT

A requester device 12 registers inspection target data in a file server 18. An inspector device 14 operated by an inspector who inspects whether the inspection target data is illegitimate or not acquires, from the file server 18, the inspection target data registered by the requester device 12 and registers an inspection result of the inspection target data in a blockchain network 22. A viewer device 16 acquires, from the blockchain network 22, the inspection result registered by the inspector device 14 and executes data processing based on the inspection result.

16 Claims, 24 Drawing Sheets

Related U.S. Application Data continuation of application No. 16/591,915, filed on Oct. 3, 2019, now Pat. No. 11,074,343, which is a continuation of application No. PCT/JP2018/014256, filed on Apr. 3, 2018.

(56) References Cited

U.S. PATENT DOCUMENTS

| | | |
|---|---|---|
| 2008/0148403 A1 | 6/2008 | Manion et al. |
| 2015/0220928 A1* | 8/2015 | Allen .................. G06Q 20/10 705/67 |
| 2016/0260095 A1 | 9/2016 | Ford |
| 2016/0261690 A1 | 9/2016 | Ford |
| 2016/0352763 A1 | 12/2016 | Zou et al. |
| 2017/0249623 A1* | 8/2017 | Cole .................. G06Q 20/29 |
| 2018/0137506 A1* | 5/2018 | Kcl .................. G06Q 20/382 |
| 2020/0034536 A1 | 1/2020 | Teruhiro |

OTHER PUBLICATIONS

International Search Report for Application No. PCT/JP2018/014256, including English translation, dated Sep. 19, 2018, 5 pages.

Noyes, "BitA V: Fast Anti-Malware by Distributed Blockchain Consensus and Feedforward Scanning" dated Jan. 7, 2016, retrieved from the Internet on Jun. 7, 2018, from URL: https://arxiv.org/pdf/1601.01405.pdf, 10 pages.

Kawaguchi et al., "Queuing Network Model of Anti-Malware User Support System" IPSJ Journal, vol. 53, No. 11, dated Nov. 15, 2012, pp. 2584-2598.

Extended European Search Report in Europe Application No. 18781236.7, dated Nov. 27, 2020, 7 pages.

Wilkinson et al., "Metadisk: Blockchain-Based Decentralized File Storage Application", dated Aug. 20, 2014, XP055454921, Retrieved from the Internet from URL: <https://storj.io/metadisk.pdf>, 11 pages.

Office action from Japanese Patent Application No. 2018-237366, dated Apr. 19, 2022, with translation (5 pages).

\* cited by examiner

INSPECTION SYSTEM 10

FIG. 4(A)

```java
import java.util.HashMap;
import java.util.Map;
import java.util.Set;

public class VirusContract {
    private final String uploaderAddress;  // address of Uploader
    private static final String ADMIN_ADDRESS = "adminAddress";  // address of Administrator. fixed value
    private Map<String, ScanResult> scanResults = new HashMap<>();  // map storing ScanResult
    private final String virusLocation;  // location of Virus file is indicated
    private final String virusHash;  // MD5 hash value of Virus file public VirusContract(String uploaderAddress, String virusLocation, String virusHash) {
        this.uploaderAddress = uploaderAddress;
        this.virusLocation = virusLocation;
        this.virusHash = virusHash;
    } public Set<String> getAllScannerAddress() {
        return scanResults.keySet();
    } public ScanResult getResult(String myAddress, String scannerAddress) {
        // 1. acquire ScanResult of scannerAddress
        ScanResult scanResult = scanResults.get(scannerAddress);
        // 2. make remittance to uploader
        transfer(myAddress, uploaderAddress);
        // 3. make remittance to scanner
        transfer(myAddress, scannerAddress);
        // 4. make remittance to Administrator
        transfer(myAddress, ADMIN_ADDRESS);

return scanResult;
    }                                                                        ⎫
                                                                             ⎬ 98
    private void transfer(String from, String to) {                          ⎭
        // remittance process
    } public String getVirusLocation() {
        return this.virusLocation;
    } public String getVirusHash() {
        return this.virusHash;
    }
}
```

FIG. 4(B)

```
    public void setScanResult(String scannerAddress,
            String judge ,
            String remark,
            String scanMethod)
    {
        ScanResult result = new ScanResult(judge, remark, scanMethod);
        this.scanResults.put(scannerAddress, result);
    } static class ScanResult {
        private String judge;      // judgement result such as "BLACK", "WHITE", etc.
        private String remark;     // additional information such as virus type, etc.
        private String scanMethod; // inspection method such as "Manual", "vendor name", "software name", etc.

public ScanResult(String judge, String remark, String scanMethod) {
            super();
            this.judge = judge;
            this.remark = remark;
            this.scanMethod = scanMethod;
        } public String getJudge() {
            return judge;
        }
        public String getRemark() {
            return remark;
        }
        public String getScanMethod() {
            return scanMethod;
        }
    }
}
```

```java
import java.util.HashMap;
import java.util.Map;
import java.util.Set;

public class IndexContract {
    private Map<String, String> addressMap = new HashMap<String, String>();
    // key is Virush Hash, value is VirusContract address public static void main(String[] args) {
        IndexContract ic = new IndexContract();
        ic.addressMap.put("vHash1", "address1");
        ic.addressMap.put("vHash2", "address2");
        ic.getAllHash();
    } public void setAddress(String virusHash, String address) {
        addressMap.put(virusHash, address);
    } public Set<String> getAllHash() {
        return addressMap.keySet();
    } public String getAddress(String virusHash) {
        return addressMap.get(virusHash);
    }
}
```

FIG. 6

```java
import java.util.Set;

public class FlowTest {
    private static final String DUMMY_UPLOADER_ADDRESS = "uploaderAddress";
    private static final String DUMMY_VIRUS_LOCATION = "virusLocation";
    private static final String DUMMY_VIRUS_HASH = "virusHash";
    private static final String DUMMY_VIRUSCONTRACT_ADDRESS = "virsusContractAddress";
    private static final String DUMMY_SCANNER_ADDRESS = "scannerAddress";
    private static final String DUMMY_SEARCHER_ADDRESS = "searchAddress";

public static void main(String[] args) {
        // 1. generate VirusContract
        VirusContract vContract = new VirusContract(DUMMY_UPLOADER_ADDRESS,     ⎫
DUMMY_VIRUS_LOCATION, DUMMY_VIRUS_HASH);                                        ⎬ 80
                                                                                ⎭

// 2. acquire Index                                                     ⎫
        IndexContract iContract = new IndexContract();                          ⎬ 82
        // 3. add Index                                                         
        iContract.setAddress(DUMMY_VIRUS_HASH, DUMMY_VIRUSCONTRACT_ADDRESS);    ⎭

// 4. acquire Index
        // acquire IndexContract (here, "iContract") from blockchain // 5. acquire VirsuContract                                              ⎫
        String address = iContract.getAddress(DUMMY_VIRUSCONTRACT_ADDRESS);      ⎬ 84
        // it is originally acquired using address as key, but vContract is simply used here ⎭

// 6. file acquisition process                                           ⎫
        String location = vContract.getVirusLocation();                          ⎬ 86
        // here file is acquired from server                                     ⎭

// 7. Scan process                                                       ⎫
        // 8. VirusContract update process                                       
        vContract.setScanResult(DUMMY_SCANNER_ADDRESS, "BLACK", "RANSOMEWARE",   ⎬ 88
"MANUAL");                                                                      
        // here reflect vContract to blockchain                                  ⎭

// 9. Index acquisition process
        // acquire IndexContract (here, "iContract") from blockchain // 10. VirusContract acquisition process                                 ⎫
        String searchTargetAddress = iContract.getAddress(DUMMY_VIRUSCONTRACT_ADDRESS); ⎬ 92
        // it is originally acquired using address as key, but vContract is simply used in the following ⎭
        Set<String> allScanner = vContract.getAllScannerAddress()               ⎫ 94
        // here display list of inspectors who registered inspection results and let viewer select preferable inspector ⎭

// 11-12. result viewing to remittance process                           ⎫
        VirusContract.ScanResult result = vContract.getResult(DUMMY_SEARCHER_ADDRESS, ⎬ 96
DUMMY_SCANNER_ADDRESS);                                                         ⎭

System.out.printf("%s %s %s", result.getJudge(), result.getRemark(), result.getScanMethod()); ⎬ 100
    }
}
```

INSPECTION SYSTEM, INSPECTION METHOD, AND COMPUTER PROGRAM

This application is a continuation application of U.S. application Ser. No. 17/354,481, filed on Jun. 22, 2021, issued as U.S. Pat. No. 11,741,229 on Aug. 29, 2023, which is a continuation application of U.S. application Ser. No. 16/591,915, filed on Oct. 3, 2019, issued as U.S. Pat. No. 11,074,343 on Jul. 27, 2021, which is a continuation application of PCT/JP2018/014256 having an international filing date of Apr. 3, 2018, which claims priority to JP2017-073830 filed Apr. 3, 2017, the entire content of each of which is incorporated herein by reference.

TECHNICAL FIELD

The present invention relates to a data processing technology, and more particularly to an inspection system, an inspection method, and a computer program.

BACKGROUND ART

In recent years, information security has been regarded as important, and anti-virus software has been introduced to many computers (See Patent Literature 1, for example).

CITATION LIST

Patent Literature

Patent Literature 1: JP 2017-021779 A

SUMMARY OF INVENTION

Technical Problem

Although the introduction of anti-virus software is in progress, in reality, one anti-virus software cannot detect all malware (computer virus, Trojan horse, spyware, and the like). Also, introducing multiple types of anti-virus software with different vendors and characteristics on one computer can be costly.

The present invention has been made in view of the above problems, and has an object to provide a technology for supporting inspection of electronic data.

Solution to Problem

In order to solve the above problems, an inspection system according to an aspect of the present invention includes a first device configured to record inspection target data in a predetermined area, a second device operated by a user who inspects whether the inspection target data is illegitimate or not, and a third device configured to use an inspection result of the inspection target data. The second device acquires the inspection target data recorded by the first device, and records an inspection result of the inspection target data in the predetermined area, and the third device acquires the inspection result recorded by the second device.

Another aspect of the present invention is also an inspection system. This inspection system includes a requester device operated by an inspection requester, one or more inspector devices operated by one or more inspectors, and a blockchain system being accessible by the requester device and the inspector device. The requester device records inspection target data in a predetermined area and records an inspection reward in the blockchain system, the inspector device acquires the inspection target data recorded by the requester device and records an inspection result of the inspection target data in the predetermined area, the requester device acquires the inspection result recorded by the inspector device and records, in the blockchain system, data of a correct-result provider who is an inspector whose inspection result is recognized to be correct by the requester, and the blockchain system distributes the inspection reward to the correct-result provider.

Another aspect of the present invention is an inspection method. This method includes a step of recording inspection target data in a predetermined area by a first device, a step of acquiring the inspection target data recorded by the first device, by a second device operated by a user who inspects whether the inspection target data is illegitimate or not, a step of recording an inspection result of the inspection target data in the predetermined area by the second device, and a step of acquiring the inspection result recorded by the second device, by a third device that uses the inspection result of the inspection target data.

Another aspect of the present invention is also an inspection method. This method includes a step of recording inspection target data in a predetermined area and recording an inspection reward in a blockchain system by a requester device operated by an inspection requester, a step of acquiring the inspection target data recorded by the requester device and recording an inspection result of the inspection target data in the predetermined area by each of one or more inspector devices operated by one or more inspectors, a step of acquiring the inspection result recorded by the one or more inspector devices and recording, in the blockchain system, data of a correct-result provider who is an inspector whose inspection result is recognized to be correct by the requester, by the requester device, and a step of distributing the inspection reward to the correct-result provide by the blockchain system.

It is noted that any combination of the above described constituent elements, one obtained by converting the description of the present invention in a program, a recording medium storing the program, or the like is also effective as an aspect of the present invention.

Advantageous Effects of Invention

The present invention can support inspection of electronic data.

BRIEF DESCRIPTION OF DRAWINGS

FIG. 4(A) is a diagram illustrating a conceptual program code of VC.

FIG. 4(B) is a diagram illustrating the conceptual program code of VC.

FIG. 5 is a diagram illustrating a conceptual program code of an IC.

FIG. 6 is a diagram illustrating a conceptual program code of an inspection App.

DESCRIPTION OF EMBODIMENTS

First Embodiment

A first embodiment proposes a technology realizing an information processing system (a later-described inspection system), in which, when a user uploads an electronic file whose legitimacy is unknown onto the network, another user connected to the network checks the legitimacy of the electronic file. The electronic file whose legitimacy is unknown can be an electronic file including malware. The inspection system according to the embodiment includes a blockchain network which is a distributed network being resistant to data tampering.

Figure 1:
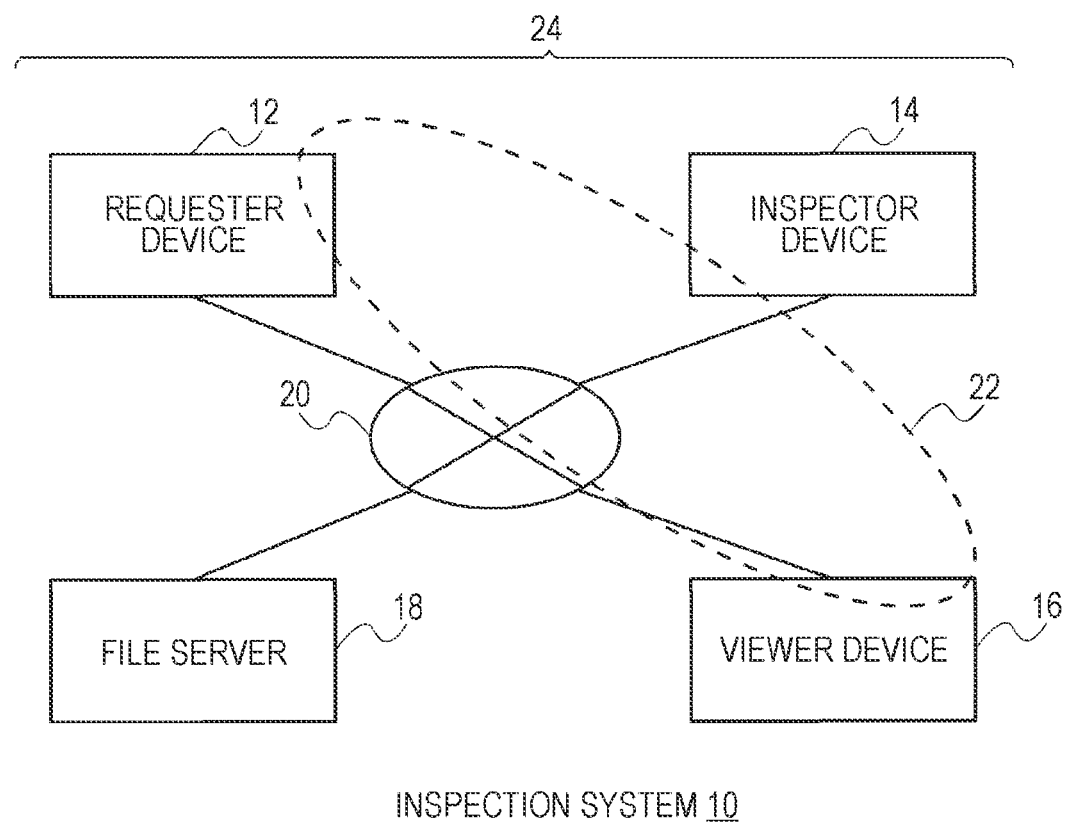
FIG. 1 is a diagram illustrating a configuration of an inspection system according to a first embodiment.

FIG. 1 illustrates a configuration of an inspection system 10 according to the first embodiment. The inspection system 10 includes a requester device 12, an inspector device 14, a viewer device 16, and a file server 18. The respective devices in FIG. 1 are connected to one another via a communication network 20 including a LAN, a WAN, the Internet, and the like.

The requester device 12 is an information processing device operated by a user (hereinafter, also referred to as a "requester") who requests an inspection of electronic data (an electronic file in the embodiment) to outside. The electronic file to be inspected (hereinafter, also referred to as a "subject file") may be an electronic file which may include malware or an electronic file whose security needs to be confirmed.

The inspector device 14 is an information processing device operated by a user (hereinafter, also referred to as an "inspector") who inspects legitimacy of the subject file (whether or not illegitimate, and malware or not, in other words). The inspector may be, for example, a specialist in information security technology. The viewer device 16 is an information processing device operated by a user (hereinafter, also referred to as a "viewer") who browses inspection results of a subject file, and is an information processing device that executes data processing using the inspection results. The requester device 12, the inspector device 14, and the viewer device 16 may be, for example, a PC, a tablet terminal, or a smartphone.

The requester device 12, the inspector device 14, and the viewer device 16 are installed with a library and an application (hereinafter, also referred to as "inspection App") for forming and using the blockchain network 22. In other words, the requester device 12, the inspector device 14, and the viewer device 16 perform Peer to Peer (P2P) communication based on a known blockchain mechanism to form the blockchain network 22.

Here, in actual, many users can participate in the inspection system 10 as a requester, an inspector, or a viewer. In addition, each user can be either the requester, the inspector, or the viewer. For example, the requester device 12 in a case of inspecting a subject file A may serve as the inspector device 14 or the viewer device 16 in a case of inspecting another subject file B. In addition, the inspector device 14 in a case inspecting a subject file C may serve as the requester device 12 or the viewer device 16 in a case of inspecting another subject file D. Furthermore, the requester and the viewer may be a same user and, in other words, the requester device 12 and the viewer device 16 may be a same device. Hereinafter, the requester device 12, the inspector device 14, and the viewer device 16 in FIG. 1 are collectively referred to as a "user device 24".

The file server 18 is an information processing device that registers a subject file from the requester device 12 and provides the registered subject file to the inspector device 14. The above mentioned inspection App is not installed in the file server 18. In other words, the file server 18 is a device that does not participate in the blockchain network 22, or a device that exists outside the blockchain network 22 in other words. Here, the file server 18 may be configured by a plurality of servers.

In the following, components of the inspection system 10 will be described with reference to block diagrams. Each block illustrated in the block diagrams of the present specification can be realized by hardware with an element such as a CPU or a memory of a computer or a mechanical device, or by software with a computer program or the like, but here, functional blocks which are realized in combination of the above are illustrated. It is understood by those skilled in the art that these functional blocks can be realized in various forms by a combination of hardware and software.

Figure 2:
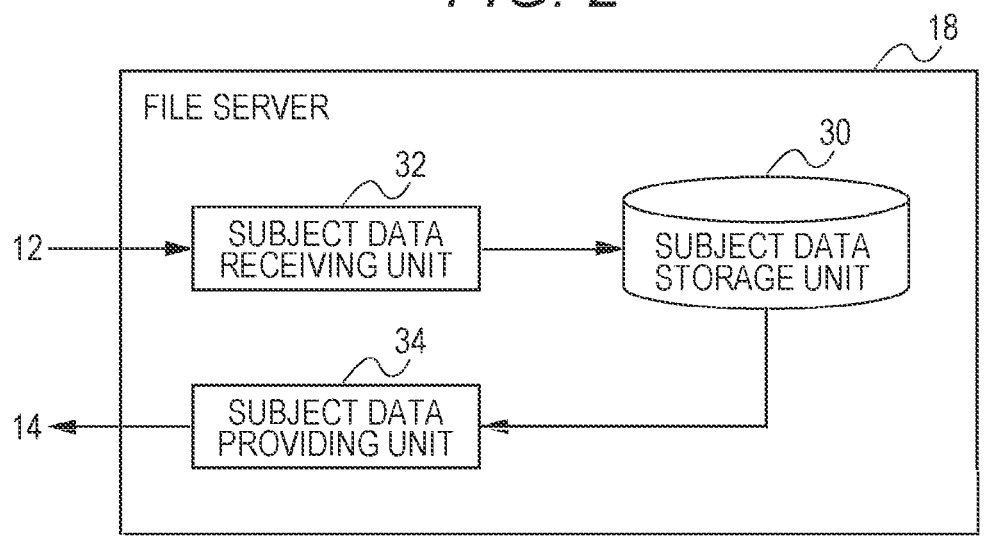
FIG. 2 is a block diagram illustrating a functional configuration of a file server of FIG. 1.

FIG. 2 is a block diagram illustrating a functional configuration of the file server 18 of FIG. 1. The file server 18 includes a subject data storage unit 30, a subject data receiving unit 32, and a subject data providing unit 34. The subject data storage unit 30 stores the subject data in association with an address (for example, a URL character string, and hereinafter also referred to as "subject file address") indicating its storage position.

The subject data receiving unit 32 receives a subject file registration request from the requester device 12. The subject data receiving unit 32 stores, in the subject data storage unit 30, the subject file included in the registration request. The subject data receiving unit 32 transmits the subject file address to the requester device 12 as a response to the registration request.

The subject data providing unit 34 receives a subject file provision request from the inspector device 14. The subject file provision request includes specification of an address (subject file address) indicating a specific subject file. The subject data providing unit 34 transmits the subject file identified by the specified subject file address from a plurality of subject files stored in the subject data storage unit 30 to the inspector device 14.

Figure 3:
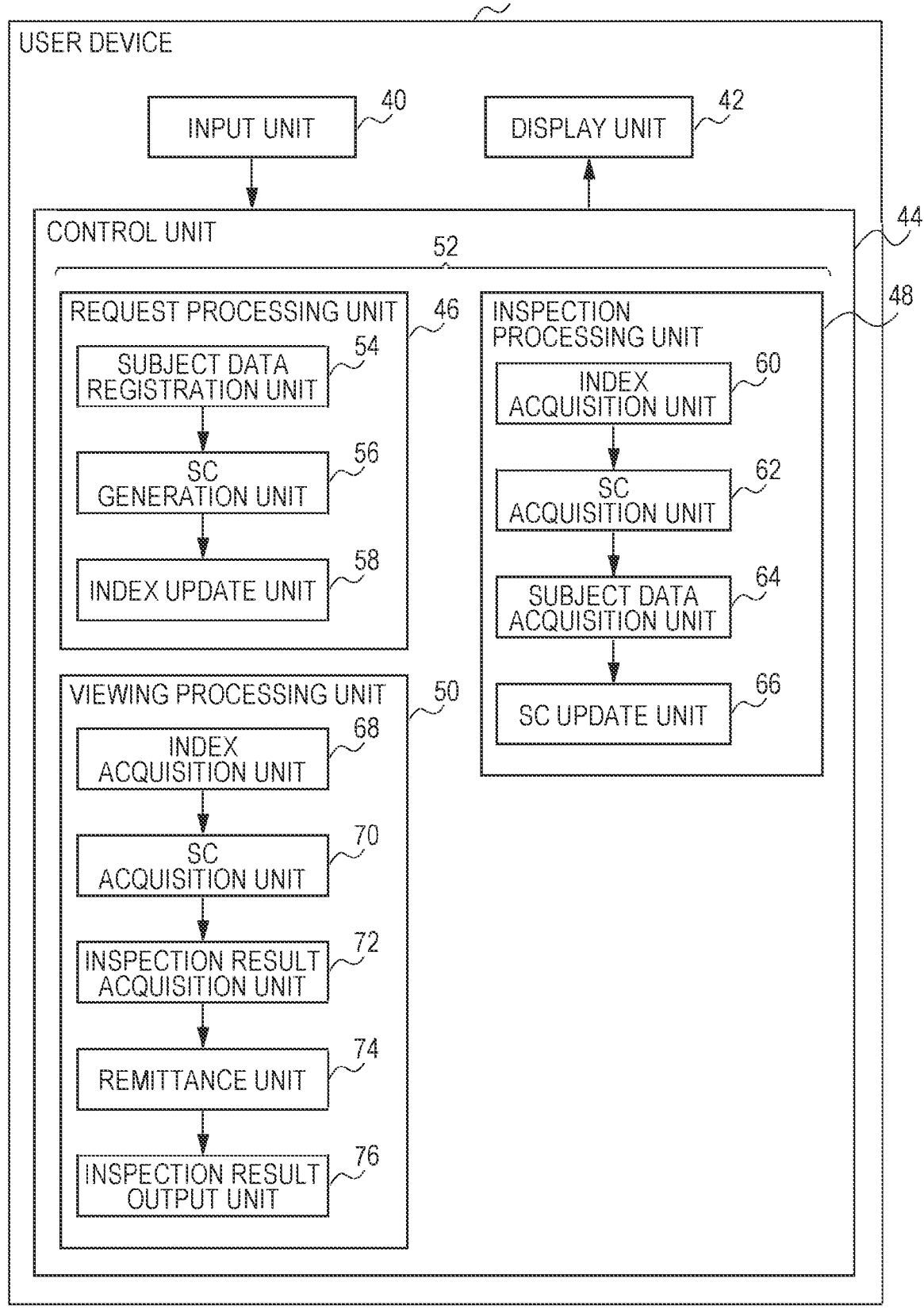
FIG. 3 is a block diagram illustrating a functional configuration of a user device of FIG. 1.

FIG. 3 is a block diagram illustrating a functional configuration of the user device 24 (that is, the requester device 12, the inspector device 14, or the viewer device 16) of FIG. 1. The user device 24 includes an input unit 40, a display unit 42, and a control unit 44. The input unit 40 receives the user's operation and inputs the operation content to the control unit 44. The display unit 42 displays image data output from the control unit 44 on the screen.

The control unit 44 executes various data processing, and includes a request processing unit 46, an inspection processing unit 48, and a viewing processing unit 50. The functions of these blocks may be realized by the CPU of the user device 24 executing an inspection App 52 stored in a memory of the user device 24. Although each of the request processing unit 46, the inspection processing unit 48, and the viewing processing unit 50 includes a plurality of modules as described later, all or some of the modules may be mounted in the file server 18 or another server, which is different from the file server 18.

Data acquisition from the blockchain network 22 and data update on the blockchain network 22 in the following description are realized by activating an application programming interface (API) included in the library of the blockchain network 22 installed in the user device 24. In actual, data of the blockchain network 22 is distributed and managed by the requester device 12, the inspector device 14, and the viewer device 16, and a base application of the blockchain network 22 realizes data synchronization between the devices.

The request processing unit 46 mainly executes processing in the requester device 12. The request processing unit 46 includes a subject data registration unit 54, an SC generation unit 56, and an index update unit 58.

The subject data registration unit 54 transmits the subject file to the file server 18 and registers the subject file in the file server 18. The subject data registration unit 54 acquires a subject file address (for example, a URL character string) indicating a storage position in the file server 18 from the file server 18 when registering the subject file.

The SC generation unit 56 generates a smart contract including attribute information on the subject file registered in the file server 18 by the subject data registration unit 54. The smart contract is also called an agent program that operates on the blockchain. This smart contract is, for example, an instance of a "VirusContract" class described later, and is hereinafter referred to as "VC" as meaning a virus contract. The attribute information on the subject file includes the subject file address in the file server 18. The SC generation unit 56 registers the generated VC in the blockchain network 22. In other words, the generated VC is added to data of the blockchain network 22 (also referred to as ledger data).

The index update unit 58 acquires, from the blockchain network 22, a smart contract including the addresses of a plurality of VCs (that is, position information on the blockchain network 22). This smart contract is, for example, an instance of a later described "IndexContract" class, and is hereinafter referred to as "IC" as meaning the index contract. The index update unit 58 adds the address of the VC generated by the SC generation unit 56 and identification information of the subject file (a hash value in the embodiment) to an acquired IC.

The inspection processing unit 48 mainly executes processing in the inspector device 14. The inspection processing unit 48 includes an index acquisition unit 60, an SC acquisition unit 62, a subject data acquisition unit 64, and an SC update unit 66.

The index acquisition unit 60 acquires an IC from the blockchain network 22. The SC acquisition unit 62 acquires, from the IC, the address of the VC associated with the identification information (the hash value of the subject file in the embodiment) of the subject file specified by the inspector. The SC acquisition unit 62 acquires the VC specified by the address from the blockchain network 22. The subject data acquisition unit 64 acquires a subject file address from the VC. The subject data acquisition unit 64 accesses the file server 18 and downloads the subject file specified by the subject file address from the file server 18.

After the inspector examines the subject file, the SC update unit 66 records the inspection result in the VC of the subject file. The SC update unit 66 registers, in the blockchain network 22, the VC of the subject file after recording the inspection result. In other words, the SC update unit 66 reflects the inspection result by the inspector on the VC of the subject file stored in the blockchain network 22.

The viewing processing unit 50 includes an index acquisition unit 68, an SC acquisition unit 70, an inspection result acquisition unit 72, a remittance unit 74, and an inspection result output unit 76.

The index acquisition unit 68 acquires an IC from the blockchain network 22. The SC acquisition unit 70 acquires, from the IC, the address of the VC associated with the identification information (the hash value of the subject file in the embodiment) of the subject file specified by the viewer. The SC acquisition unit 70 acquires, from the blockchain network 22, the VC specified by the address. The inspection result acquisition unit 72 acquires the inspection result of the subject file from the VC acquired by the SC acquisition unit 70. In other words, the inspection result acquisition unit 72 acquires the inspection result of the subject file stored on the blockchain network 22.

The remittance unit 74 executes a reward payment to both the inspector and the requester in synchronization with the timing at which the inspection result is acquired. For example, the remittance unit 74 may execute a remittance (transfer) process from a viewer's account to an inspector's account and may execute a remittance process from the viewer's account to a requester's account. The inspection result acquisition unit 72 may acquire the inspection result of the subject file on condition that the remittance process by the remittance unit 74 is successful.

In addition, the remittance unit 74 records the remittance from the viewer to the requester and the information on the remittance from the viewer to the inspector in the ledger data of the blockchain network 22 (or another blockchain for money exchange). This improves the certainty of reward payment and prevents the payment amount from tampering.

The inspection result output unit 76 outputs the inspection result data acquired by the inspection result acquisition unit 72 to the display unit 42, and causes the display unit 42 to display the inspection result. According to the present embodiment, an inspection App 52 including the request processing unit 46, the inspection processing unit 48, and the viewing processing unit 50 is introduced to the requester device 12, the inspector device 14, and the viewer device 16. As a modification, an inspection App including only the function of the request processing unit 46 may be introduced to the requester device 12. Further, an inspection App including only the function of the inspection processing unit 48 may be introduced to the inspector device 14, and an inspection App including only the function of the viewing processing unit 50 may be introduced to the viewer device 16.

FIGS. 4(A) and 4(B) illustrate a conceptual program code of VC (VirusContract.java) ("java" is a registered trademark). FIG. 4(B) illustrates the continuation of FIG. 4(A). FIG. 5 illustrates a conceptual program code of the IC (IndexContractjava). FIG. 6 illustrates a conceptual program code of the inspection App 52 using VC and IC (FlowTest.java). These program codes will be appropriately referred to in the description of the flowcharts described later.

Operation of the Inspection System 10 Having the Above Configuration Will be Described.

Figure 7:
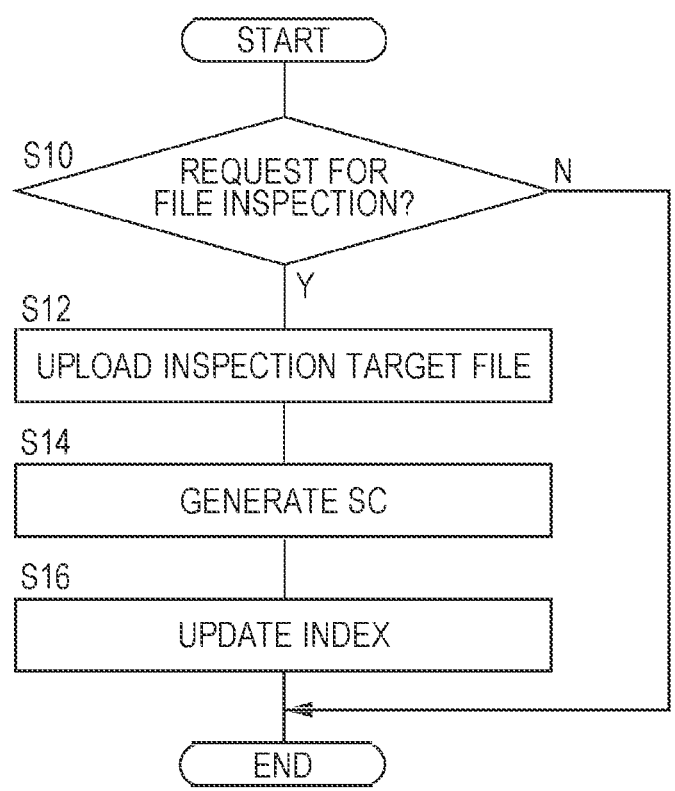
FIG. 7 is a flowchart illustrating operation of a requester device.

FIG. 7 is a flowchart illustrating operation of the requester device 12. When the requester specifies a subject file to be inspected in a GUI of the inspection App 52 (Y in S10), the subject data registration unit 54 of the requester device 12 registers the subject file in the file server 18. At the same time, the subject data registration unit 54 acquires the subject file address in the file server 18 from the file server 18 (S12). The subject data registration unit 54 transfers the subject file and the subject file address to the SC generation unit 56.

The SC generation unit 56 uses the address of the requester device 12 on the blockchain network 22, the subject file address, and the subject file hash value as parameters, as indicated by a code 80 in FIG. 6, to generate a smart contract for the subject file address (hereinafter, referred to as "VC") (S14). A hash function used to generate the hash value may be, for example, MD5. Although not illustrated in the code 80, the SC generation unit 56 further registers the generated VC instance in the blockchain network 22 and acquires an address of the VC instance on the blockchain network 22.

The index update unit 58 acquires a smart contract for index (hereinafter, referred to as "IC") as indicated by a code 82 in FIG. 6. In practice, the index update unit 58 calls the API of the blockchain network 22 to acquire the IC registered in the blockchain network 22. The index update unit 58 adds the hash value (key) of the subject file and the address (value) of the VC to an address map (addressMap in FIG. 5) of the acquired IC (S16). In a case where the operation to specify the subject file is not input (N in S10), S12 to S16 are skipped and the flow of this drawing ends.

Figure 8:
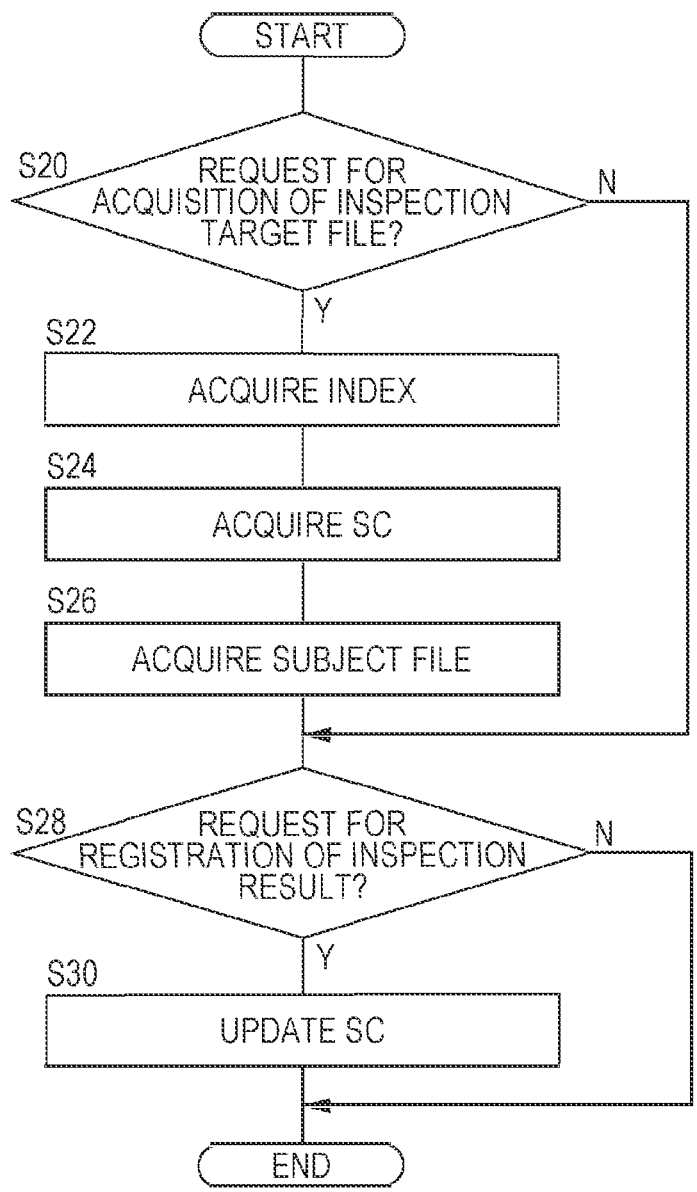
FIG. 8 is a flowchart illustrating operation of an inspector device.

FIG. 8 is a flowchart illustrating operation of the inspector device 14. When the inspector requests acquisition of a specific subject file in the GUI of the inspection App 52 (Y in S20), the index acquisition unit 60 of the inspector device 14 acquires an IC registered in the blockchain network 22 (S22). In the present embodiment, the inspector specifies the hash value of the subject file to be acquired. The SC acquisition unit 62 acquires the VC address of the subject file from the IC, using the hash value of the subject file as a key, as indicated by the code 84 in FIG. 6. Then, the SC acquisition unit 62 acquires the VC of the subject file registered in the blockchain network 22 using the VC address as a key (S24).

The subject data acquisition unit 64 acquires the subject file address in the file server 18 from the VC, as indicated by a code 86 in FIG. 6. Then, subject data acquisition unit 64 acquires a subject file from file server 18 by using a subject file address as a key (S26). When the operation for requesting acquisition of the subject file is not input (N in S20), S22 to S26 are skipped. The inspector who has acquired the subject file uses the inspector device 14 or another device to inspect whether the subject file is illegitimate or not (for example, whether or not malware is included). For example, the inspector may perform the inspection using existing anti-virus software. Also, the inspector may manually analyze the subject file binary.

On the GUI of the inspection App 52, the inspector inputs inspection result information including a determination result, additional information, and an inspection method. When the inspector requests for registration of the inspection result for the subject file (Y in S28), the SC update unit 66 adds the inspector address on the blockchain network 22 and the inspection result information to the VC of the subject file, as indicated by the code 88 in FIG. 6 and the code 90 in FIG. 4(B) (S30). Although not illustrated in the code 88, the SC update unit 66 further registers, in the blockchain network 22, the VC to which the inspection result information has been added. In a case where the operation for requesting registration of the inspection result is not input (N in S28), S30 is skipped and the flow of this drawing ends.

Figure 9:
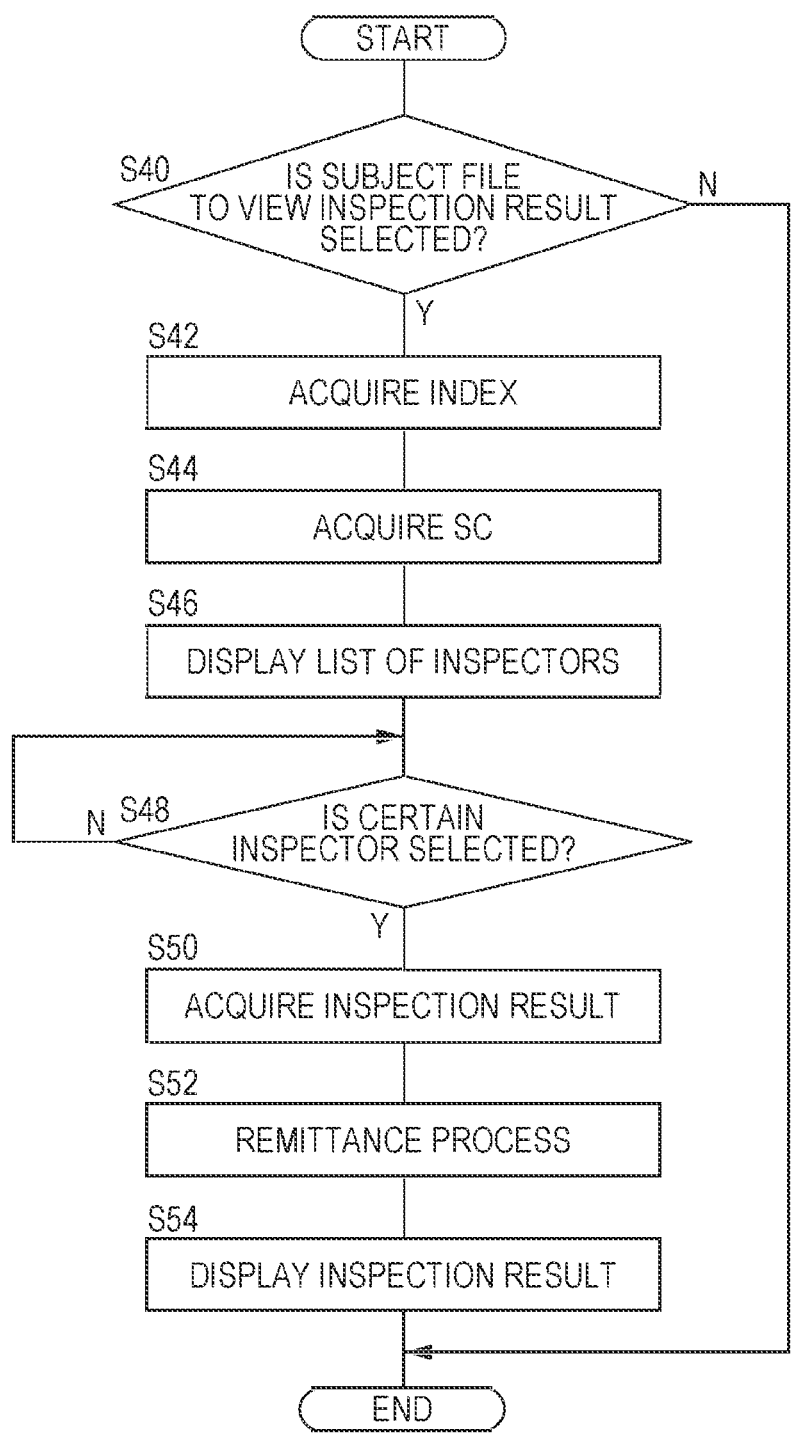
FIG. 9 is a flowchart illustrating operation of a viewer device.

FIG. 9 is a flowchart illustrating operation of the viewer device 16. In a case where the viewer selects a subject file to view the inspection result in the GUI of the inspection App 52 (Y in S40), the index acquisition unit 68 of the viewer device 16 acquires the IC registered in the blockchain network 22 (S42). According to the present embodiment, the inspector specifies the hash value of the subject file of an inspection result viewing target. The SC acquisition unit 62 acquires the address of the VC of the subject file from the IC, using the hash value of the subject file as a key, as indicated by a code 92 in FIG. 6. Then, the SC acquisition unit 62 acquires the VC of the subject file registered in the blockchain network 22 using the VC address as a key (S44).

As indicated by a code 94 in FIG. 6, the inspection result acquisition unit 72 acquires a list of inspectors who registered inspection results for the subject file, and the inspection result output unit 76 displays the list of the inspectors on the display unit 42 (S46). The inspection result output unit 76 stays standby until the viewer selects a specific inspector to display his/her inspection result (N in S48). In a case where the viewer selects a specific inspector (Y in S48), the inspection result acquisition unit 72 acquires the inspection result by the selected inspector (S50). More specifically, as indicated by a code 96 in FIG. 6 and the code 98 in FIG. 4(A), the inspection result acquisition unit 72 specifies the address of the viewer and the address of the selected inspector as parameters, and acquires the inspection result associated with the address of the inspector.

The remittance unit 74 executes a remittance process from the viewer to the requester and executes a remittance process from the viewer to the inspector, as indicated by a code 98 in FIG. 4(a). Furthermore, according to the present embodiment, the remittance unit 74 executes a remittance process from the viewer to the administrator of the inspection system 10 (S52). In other words, when the viewer browses the inspection result, a reward is paid to the three parties, which are the requester, the inspector, and the administrator. The inspection result output unit 76 causes the display unit 42 to display the inspection result acquired by the inspection result acquisition unit 72, as indicated by a code 100 in FIG. 6 (S54). In a case where the subject file whose inspection result is to be viewed is not selected (N in S40), S42 to S54 are skipped and the flow of the drawing ends.

The operation of the inspection system 10 related to the inspection of one subject file is performed in a flow of registration of the subject file, inspection of the subject file, and viewing of the inspection result. Therefore, in the inspection of the one subject file, the process of FIG. 7 by the requester device 12, the process of FIG. 8 by the inspector device 14, and the process of FIG. 9 by the viewer device 16 are executed in order. In the actual inspection system 10, the processes on a plurality of subject files are performed in parallel. The requester device 12, the inspector device 14, and the viewer device 16 always execute a synchronization process of data (VC, IC, and the like) in the blockchain network 22.

In the inspection system 10 according to the present embodiment, one or more inspectors on the network inspect the legitimacy of the electronic data uploaded by the requester, and the viewer (including the requester) can confirm the inspection results. With this configuration, malware detection accuracy can be improved with cooperation of other users, while all malware cannot be completely detected with only anti-virus software.

Further, in the inspection system 10, the attribute information and the inspection result of the subject file are transmitted and received via the blockchain network 22. With this configuration, the attribute information and the inspection result of the subject file cannot be easily tampered, and security level can be further improved. Also, a subject file itself, which has a relatively large data size, may be transmitted and received outside the blockchain network 22 so that load on the blockchain network 22 can be suppressed.

Further, in the inspection system 10, when the viewer browses the inspection results, a reward is paid to the requester and the inspector. This configuration can be incentive to upload the subject file and inspect the subject file in the inspection system 10. In addition, the viewer can specify the inspection result to view based on its inspector. In other words, the viewer can selectively view the inspection result by a desired inspector such as an inspector who provides the inspection result with high accuracy or a reliable inspector. As a result, the reward is paid only to the inspector selected by the viewer, and this may be inspector's incentive to register accurate inspection results.

The present invention has been described above based on the first embodiment. It is understood by those skilled in the art that the first embodiment is an exemplification, that various modifications can be made to the combination of each component and each processing process, and that such modifications are also within the scope of the present invention.

First Modification

According to the above embodiment, while the subject file is managed by the file server 18, various pieces of attribute information (address, inspection result, and the like) related to the subject file are managed by blockchain network 22 composed of the requester device 12, the inspector device 14, and the viewer device 16. As a modification, one device (hereinafter, referred to as an "inspection support device") may centrally manage both the subject file and the attribute information related to the subject file.

The inspection support device may have both the functions of the file server 18 according to the present embodiment and the functions of the blockchain network 22 according to the present embodiment. More specifically, the inspection support device may include an inspection result storage unit, an inspection result receiving unit, and an inspection result providing unit, in addition to the subject data storage unit 30, the subject data receiving unit 32, and the subject data providing unit 34 in the file server 18 according to the present embodiment. The inspection result storage unit may store an inspection result in association with subject data (a subject data address, for example). The inspection result receiving unit may receive information indicating the inspection result for the subject file transmitted from the inspector device 14 and store the information in the inspection result storage unit. The inspection result providing unit may provide the viewer device 16 with the inspection result corresponding to the subject file specified by the viewer device 16 from the inspection results stored in the inspection result storage unit.

Second Modification

The requester device 12, the inspector device 14, and the viewer device 16 may be devices that automatically execute the process for inspecting the subject file without operation by a person. For example, when an existence of an electronic file whose legitimacy is difficult to determine is detected, the requester device 12 may automatically executes processes of uploading the electronic file as a subject file to the file server 18, generating an SC of the subject file, and further updating an IC.

The requester device 12 according to the second modification may be an electronic mail server, and the subject file may be a file attached to an electronic mail. The electronic mail server may upload the attached file, for which no abnormality is detected by the local anti-virus software, to the file server 18 as a subject file. Also, the e-mail server may upload the attached file to the file server 18 as a subject file, when the local anti-virus software does not detect any abnormality, but its file type, size, name, or the like deviates from predetermined criteria (white list, or the like).

Further, the viewer device 16 according to the second modification may delete the subject file according to the inspection result, instead of displaying the inspection result of the subject file. In addition, when the inspection result indicates that the subject file is illegitimate, the viewer device 16 may stop predetermined data processing related to the subject file. For example, the viewer device 16 may be an electronic mail server. The electronic mail server may stop transferring electronic mail attached with the subject file or may discard the electronic mail when the subject file is determined to be illegitimate.

Third Modification

Figure 10:
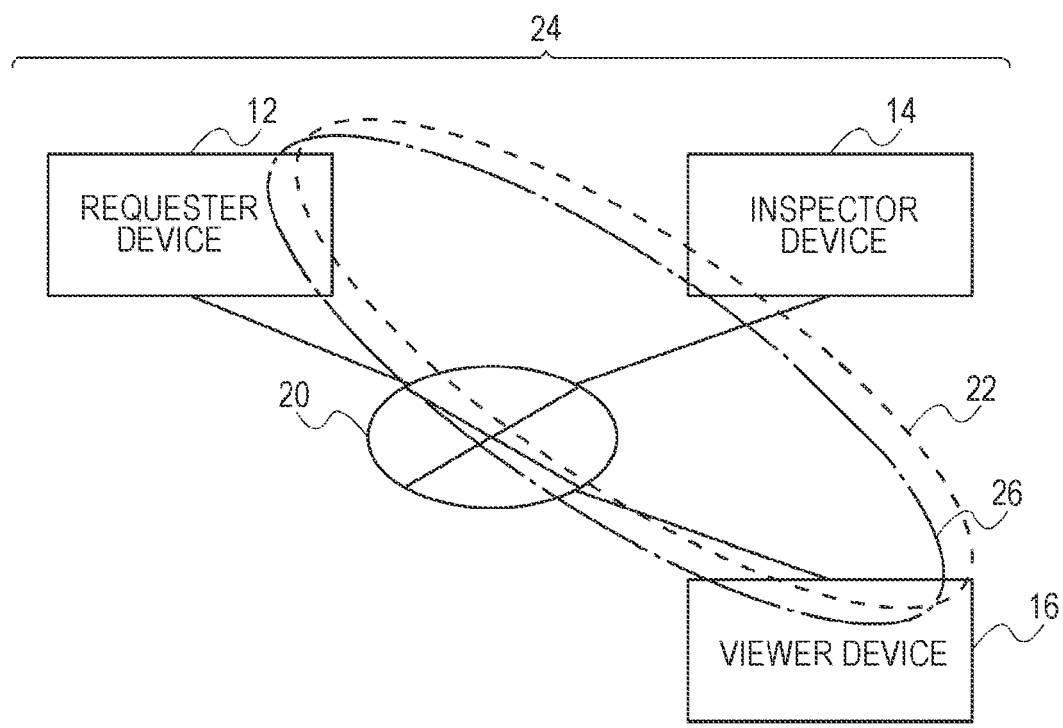
FIG. 10 is a diagram illustrating a configuration of an inspection system of a third modification.

FIG. 10 illustrates a configuration of the inspection system according to a third modification. In the inspection system 10 according to the above embodiment, the subject file is registered in the file server 18. According to the third modification, the inspection system 10 does not include the file server 18, and the subject file is registered in a P2P network 26 (the one-dot chain line in FIG. 10) different from the blockchain network 22 (the dashed line in FIG. 10).

A well-known library and application (hereinafter, also referred to as "P2P module") for exchanging the subject file by P2P communication may be introduced to each of the user devices 24 according to the third modification. The subject data registration unit 54 of the user device 24 (the requester device 12, in other words) may register the subject file (or the subject file and its hash value) in the P2P network 26 using the P2P module (S12 in FIG. 7). For example, the subject data registration unit 54 may transmit the subject file to each of the plurality of other user devices 24.

Further, the subject data acquisition unit 64 of the user device 24 (the inspector device 14, in other words) may acquire the subject file registered in the P2P network 26 using the P2P module (S26 in FIG. 8). For example, the subject data acquisition unit 64 may acquire the subject file corresponding to the hash value of the subject file acquired from the blockchain network 22 from the storage in the P2P network 26 using the hash value as a key.

As another mode of the third modification, one user device 24 (inspector device 14) may acquire or refer to a subject file registered in the local storage of another user device 24 (requester device 12). According to the configuration of the third modification, the subject file can be exchanged between different user devices 24 without providing the file server 18.

Second Embodiment

Also according to the second embodiment, an inspection system is proposed which supports inspection of electronic data (hereinafter, also referred to as a "sample") by using the blockchain technology. The sample according to the second embodiment corresponds to the subject file of the first embodiment. Typically, the sample is an electronic file which may include malware or an electronic file whose security is desired to be confirmed, or may be various electronic data to be inspected. In the following, the elements same as the elements described in the first embodiment will be described using the same reference numerals. Further, the contents described in the first embodiment will be omitted according to need.

Figure 11:
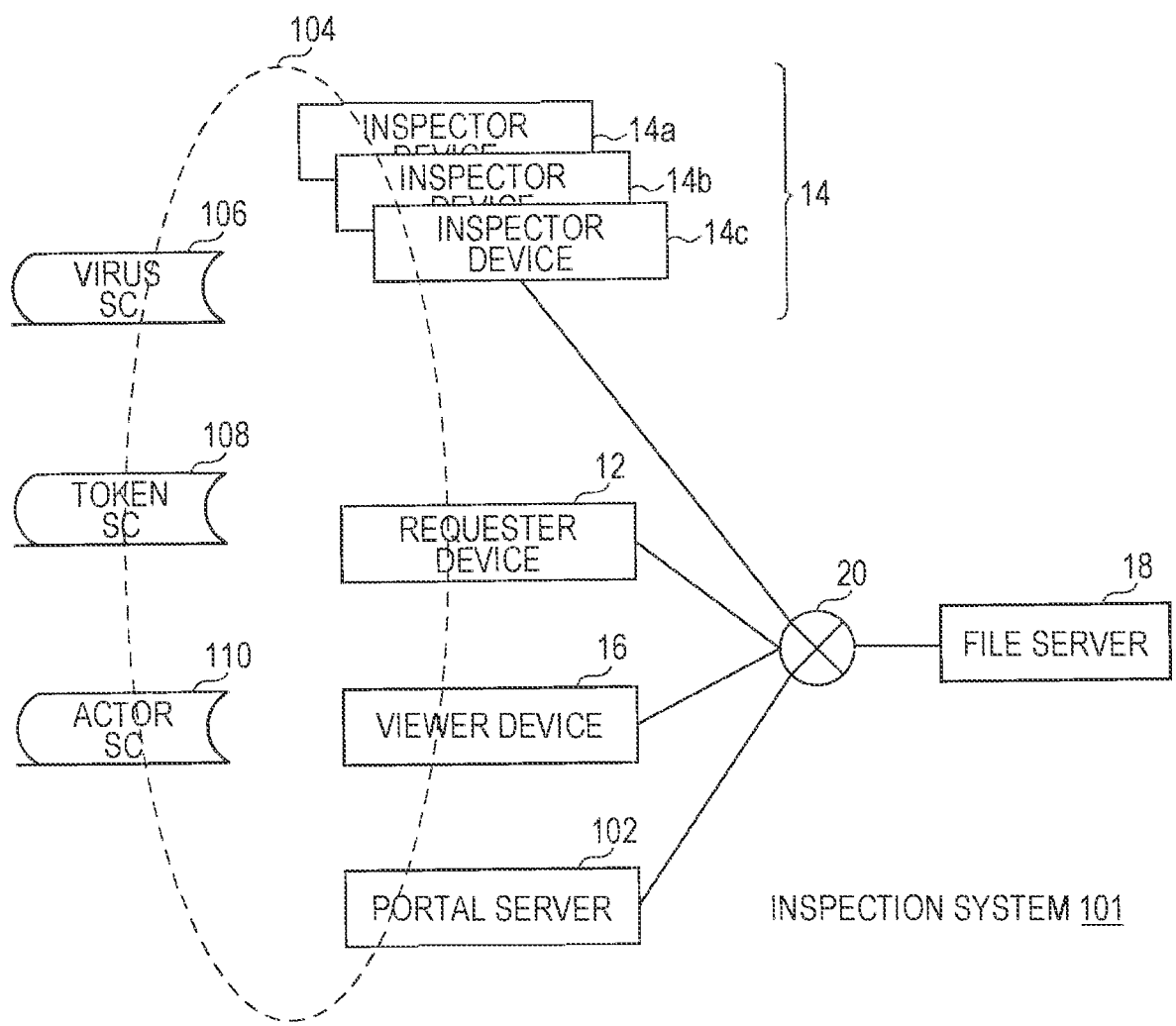
FIG. 11 is a diagram illustrating a configuration of an inspection system according to a second embodiment.

FIG. 11 illustrates a configuration of an inspection system 101 according to the second embodiment. The inspection system 101 includes a requester device 12, an inspector device 14a, an inspector device 14b, an inspector device 14c, a viewer device 16, a file server 18, and a portal server 102. These devices are connected via a communication network 20.

The inspector device 14a, the inspector device 14b, and the inspector device 14c are information processing devices operated by different inspectors. The inspector device 14a, the inspector device 14b, and the inspector device 14c are referred to an inspector device 14, when they are collectively mentioned. The portal server 102 is a web application server that provides various types of information related to the inspection system 101 to the requester device 12, the inspector device 14, and the viewer device 16.

The inspection system 101 also includes a blockchain system 104 corresponding to the blockchain network 22 of the first embodiment. In the requester device 12, the inspector device 14, and the viewer device 16, a library and an application to from and use the blockchain system 104 are installed.

The blockchain system 104 can also be called a distributed database system (distributed ledger system), and is built on Ethereum, which is one of blockchain platforms. The blockchain system 104 includes three smart contract programs, which are a virus SC 106, a token SC 108, and an actor SC 110. These smart contracts are accessible from each of the requester device 12, the inspector device 14, the viewer device 16, and the portal server 102, and are synchronized between these devices.

The virus SC 106 is a smart contract that stores data and processes data, related to sample inspection. The token SC 108 is a smart contract that stores data and processes data, related to a token that is a virtual currency in the inspection system 101. The actor SC 110 is a smart contract that stores data and processes data, related to an actor (mainly the requester and the inspector) of the inspection system 101.

Although one requester device 12 and one viewer device 16 are illustrated in FIG. 11, the inspection system 101 may include a plurality of requester devices 12 of different requesters and a plurality of viewer devices 16 of different viewers. Also, as described in the first embodiment, one user can participate in the inspection system 101 in any position of the requester, the inspector, and the viewer. For example, one information processing device may function as the requester device 12, the inspector device 14, and the viewer device 16.

In the following, functional blocks of the requester device 12, the inspector device 14, and the viewer device 16 will be separately described; however, the function of each device may be provided by an application program as described in the first embodiment (FIG. 3). Also, the function of each device may be provided by each device executing a web application program provided by a predetermined web server (the portal server 102, for example).

Figure 12:
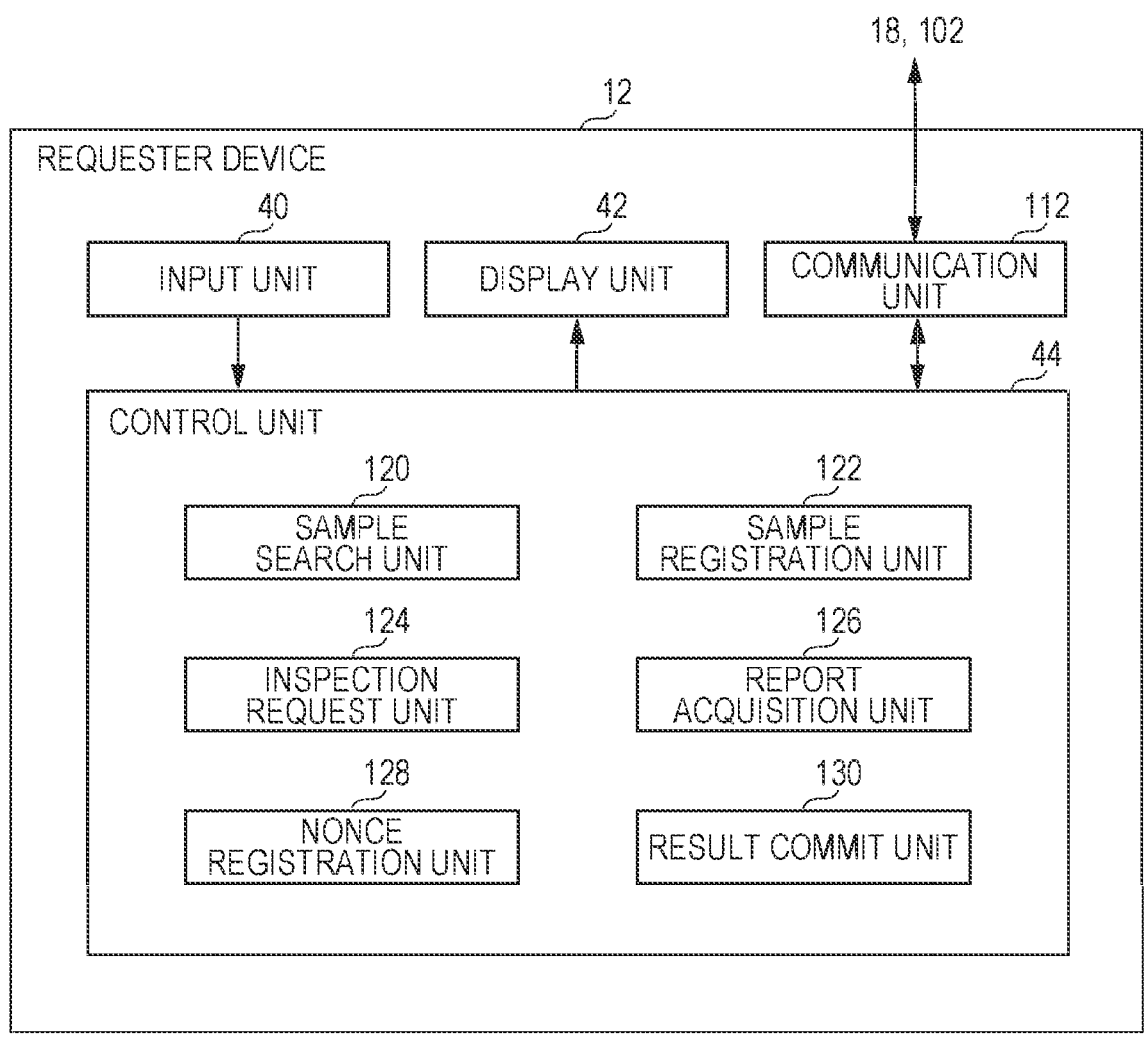
FIG. 12 is a block diagram illustrating functional blocks of a requester device of FIG. 11.

FIG. 12 is a block diagram illustrating functional blocks of the requester device 12 of FIG. 11. The requester device 12 includes an input unit 40, a display unit 42, a control unit 44, and a communication unit 112. The communication unit 112 communicates with an external device according to a predetermined communication protocol. The control unit 44 transmits and receives data to and from the file server 18 and the portal server 102 via the communication unit 112.

The control unit 44 includes a sample search unit 120, a sample registration unit 122, an inspection request unit 124, a report acquisition unit 126, a nonce registration unit 128, and a result commit unit 130. The sample search unit 120 acquires, from the portal server 102, information on one or more samples, which are being inspected or have been inspected. The sample registration unit 122 registers a sample to be inspected in the file server 18. The inspection request unit 124 registers a sample inspection request in the blockchain system 104. For example, the inspection request unit 124 records an inspection reward in the blockchain system 104.

The report acquisition unit 126 acquires, from the file server 18, an evaluation report indicating a sample evaluation result by the inspector. When a plurality of inspectors participate in the inspection of the sample registered by the requester, the report acquisition unit 126 acquires a plurality of evaluation reports created by the plurality of inspectors from the file server 18. The evaluation result by the inspector indicates at least one of "white" representing that the sample is legitimate (not malware, for example) and "black" representing that the sample is illegitimate (malware, for example).

Here, in addition to the evaluation result by the inspector, a graded score indicating a degree of confidence of the inspector regarding the evaluation result (a value that the inspector himself/herself evaluates certainty that his/her evaluation result is correct) may be included in the evaluation report created by the inspector. For example, "white; 80%" represents that the inspector determines that the sample is legitimate and that the inspector thinks that the certainty is 80%. The degree of confidence of the inspector regarding the evaluation result may be the above described graded score, or may be graded assessment such as "confident", "somewhat confident", or "not confident".

The nonce registration unit 128 registers, in the portal server 102, a nonce (a random number, in other words) (hereinafter, also referred to as "result nonce") generated by a predetermined random number generator. The result commit unit 130 cooperates with the virus SC 106 to execute result commit processing. For example, the result commit unit 130 may call a method for result commit processing implemented in the virus SC 106. Here, according to the present embodiment, calling the method of the smart contract may be replaced with issuing a transaction to the smart contract by another known method.

Figure 13:
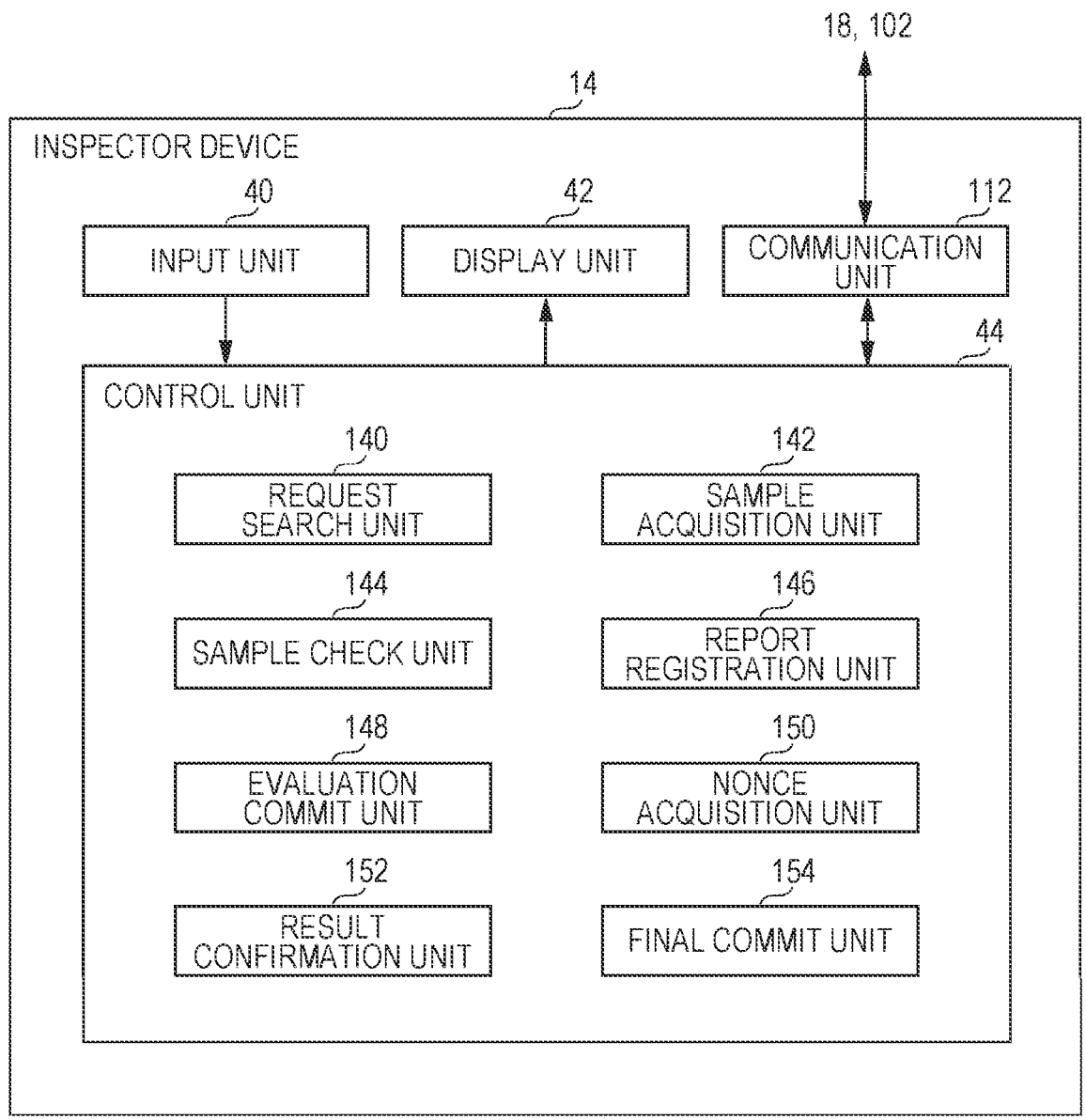
FIG. 13 is a block diagram illustrating functional blocks of an inspector device of FIG. 11.

FIG. 13 is a block diagram illustrating functional blocks of the inspector device 14 of FIG. 11. The control unit 44 of the inspector device 14 includes a request search unit 140, a sample acquisition unit 142, a sample check unit 144, a report registration unit 146, an evaluation commit unit 148, a nonce acquisition unit 150, a result confirmation unit 152, and a final commit unit 154.

The request search unit 140 acquires information on one or more registered inspection requests from the portal server 102. The sample acquisition unit 142 acquires, from the file server 18, a sample selected by the inspector. The sample check unit 144 checks a hash value and verifies the legitimacy (no tampering, in other words) of the sample acquired by the sample acquisition unit 142. The report registration unit 146 registers, in the file server 18, the evaluation report created by the inspector after inspecting the sample.

The evaluation commit unit 148 cooperates with the virus SC 106 to execute an evaluation commit process. For example, the result commit unit 130 may call a method for evaluation commit implemented in the virus SC 106.

The nonce acquisition unit 150 acquires a result nonce registered in the portal server 102. The result confirmation unit 152 confirms whether the requester finally determines that the sample is legitimate ("white") or illegitimate ("black") (hereinafter, also referred to as "black-and-white judgement result"). The final commit unit 154 cooperates with the virus SC 106 to execute final commit processing. For example, the final commit unit 154 may call a method for final commit implemented in the virus SC 106.

Figure 14:
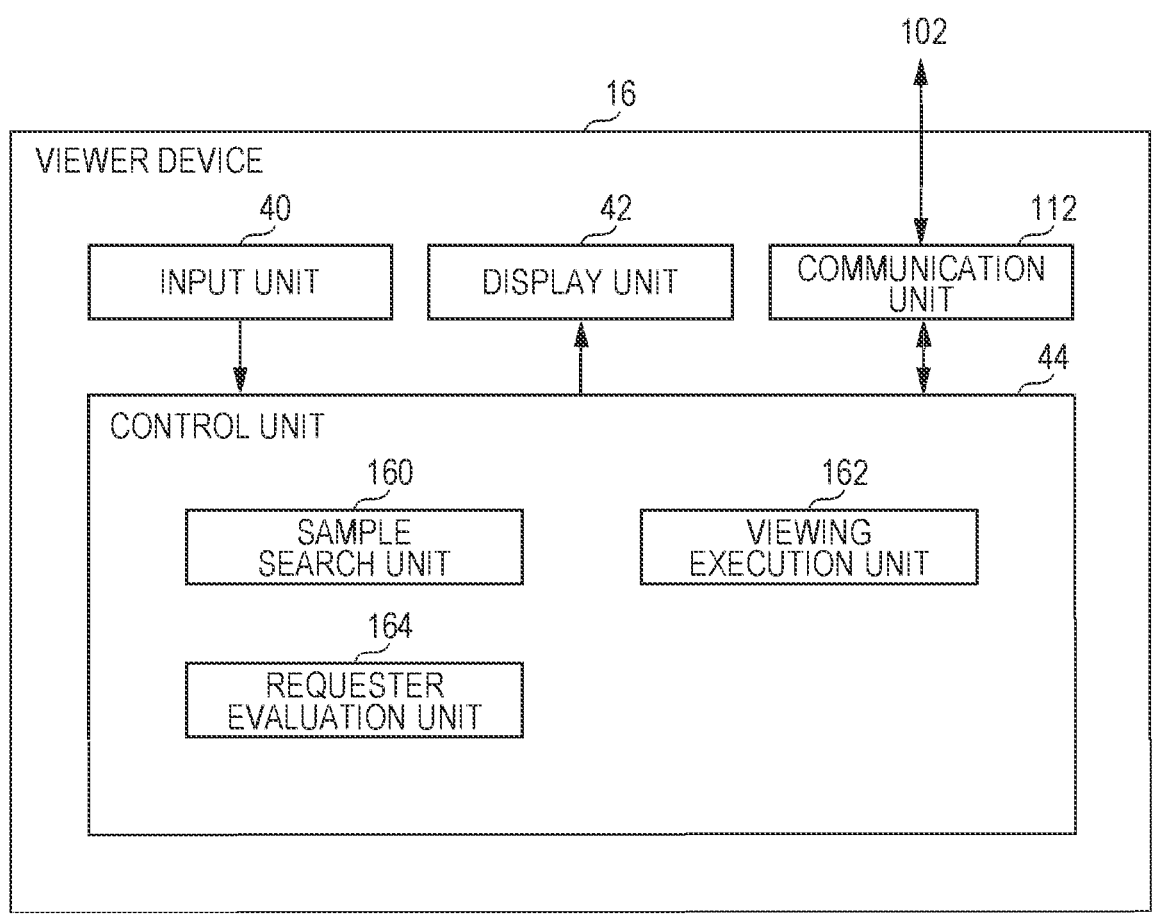
FIG. 14 is a block diagram illustrating functional blocks of a viewer device of FIG. 11.

FIG. 14 is a block diagram illustrating functional blocks of the viewer device 16 of FIG. 11. The control unit 44 of the viewer device 16 includes a sample search unit 160, a viewing execution unit 162, and a requester evaluation unit 164.

The sample search unit 160 acquires, from the portal server 102, information on one or more samples during and after the inspection. The viewing execution unit 162 cooperates with the virus SC 106 to execute a process for viewing the inspection result of the sample selected by the viewer. The requester evaluation unit 164 executes processing for evaluating the requester in cooperation with the virus SC 106. For example, the requester evaluation unit 164 may call a method for viewing processing implemented in the virus SC 106.

Figure 15:
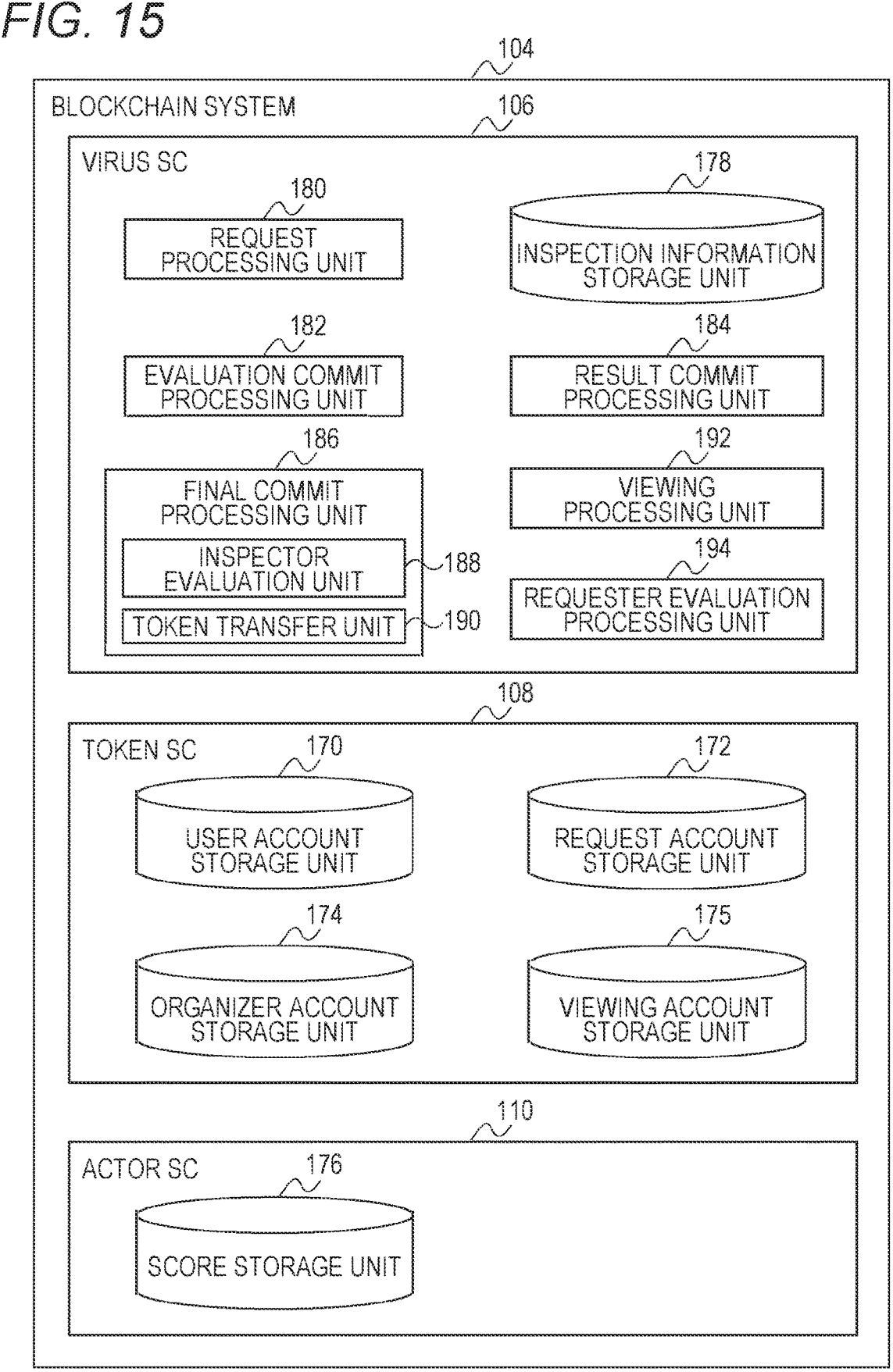
FIG. 15 is a block diagram illustrating functional blocks of a blockchain system of FIG. 11.

FIG. 15 is a block diagram illustrating functional blocks of the blockchain system 104 of FIG. 11. As described above, the blockchain system 104 includes the virus SC 106, the token SC 108, and the actor SC 110.

The token SC 108 includes a user account storage unit 170, a request account storage unit 172, an organizer account storage unit 174, and a viewing account storage unit 175. The user account storage unit 170 stores information on an account (requester account) owned by the requester, information on a plurality of accounts (inspector accounts) owned by a plurality of inspectors, and information on an account (viewer account) owned by a viewer. According to the second embodiment, each user owns a token which is a virtual currency defined by the inspection system 101. In the account information of each user, balance information of the token owned by each user is recorded. Each user's account is identified by an address of each user.

The request account storage unit 172 stores information on a plurality of accounts (inspection request accounts) corresponding to a plurality of inspection requests. The inspection request account is identified by the hash value of the sample to be inspected. In the inspection system 101, every time a new inspection request is registered, a new inspection request account is established. The organizer account storage unit 174 stores information on an account owned by an organizer of the inspection system 101. For example, the organizer is a company that provides the file server 18, the portal server 102, and the blockchain system 104. The viewing account storage unit 175 stores information on an account (viewing account) established for each viewing. The viewing account is identified by the viewer's address.

The actor SC 110 includes a score storage unit 176. The score storage unit 176 stores a score of the requester and respective scores of the plurality of inspectors. The requester score is modified according to the requester evaluation result by the viewer as described later, and affects the amount of the fee to the organizer paid at the time of registration of the inspection request. More specifically, a requester whose score is lower pays a higher fee. The inspector score is modified according to whether the inspector evaluation result is correct or not (whether or not the result is judged to be correct by the requester, in the embodiment), and affects the reward distribution ratio. More specifically, an inspector whose score is relatively high has a relatively high distribution ratio.

Further, the actor SC 110 may include a transaction history storage unit (not illustrated). The transaction history storage unit stores a number of request registrations of the requester, a number of fee payments, a number of unpaid fees, an accumulated sum of registered awards and the like, a number of inspector evaluation report registrations, a number of correct responses, a number of incorrect responses, an average value of graded scores indicating a degree of confidence of the inspector regarding evaluation results, an accumulated sum of earned rewards, a number of times of viewing, and the like, and is updated according to the processing in the inspection system. The requester score and the inspector score may be calculated and updated based on values stored in the transaction history storage unit.

The virus SC 106 includes an inspection information storage unit 178, a request processing unit 180, an evaluation commit processing unit 182, a result commit processing unit 184, a final commit processing unit 186, a viewing processing unit 192, and a requester evaluation processing unit 194. The inspection information storage unit 178 stores inspection information generated for each inspection request from the requester. The inspection information includes a plurality of items related to the inspection request or the sample.

Figure 16:
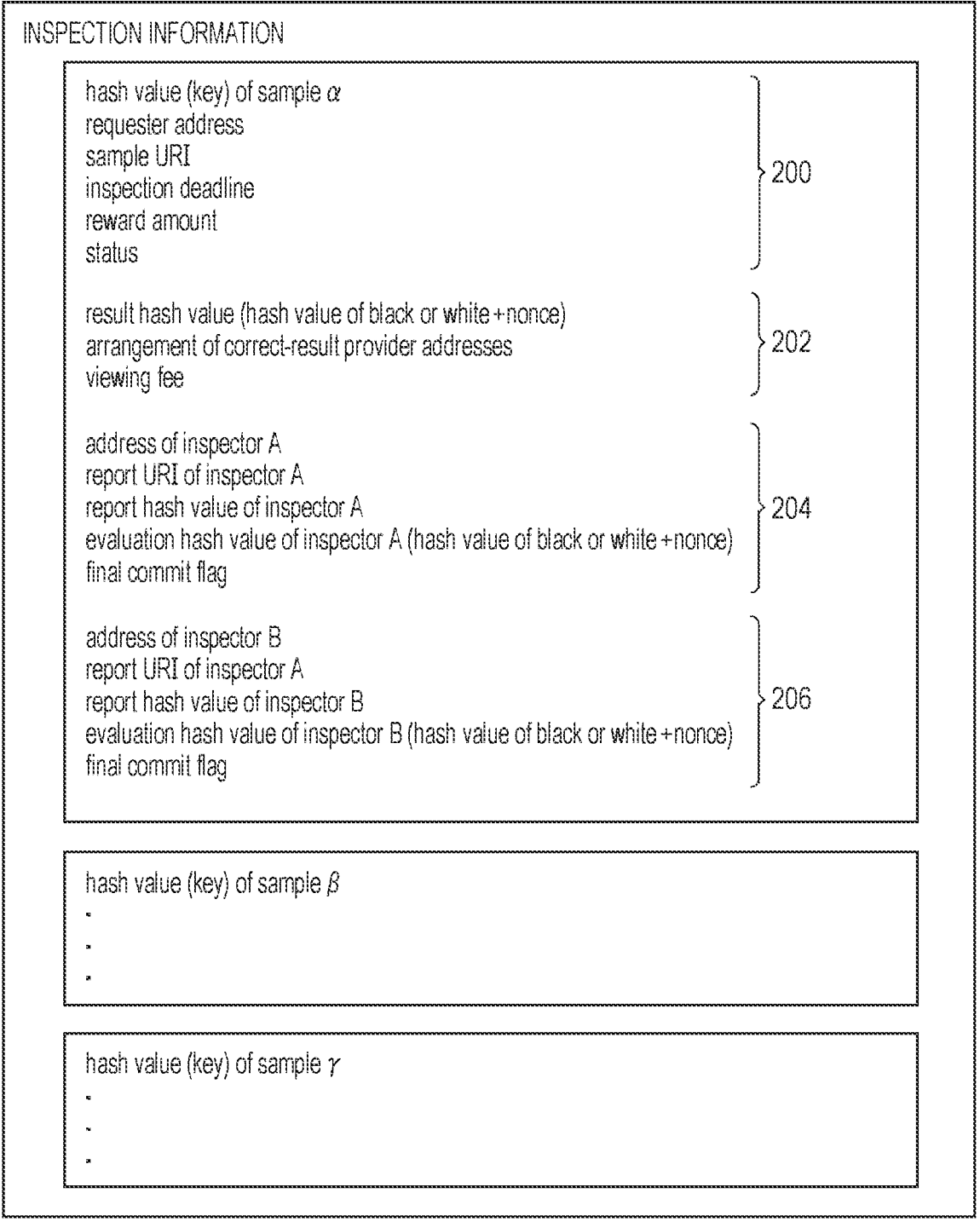
FIG. 16 is a diagram illustrating an example of inspection information.

FIG. 16 illustrates an example of inspection information. The hash value of the sample is a key of each piece of inspection information. A requester setting item 200 and a requester setting item 202 are information items set by the requester device 12 which has registered an inspection request for a sample a. The inspector setting item 204 and the inspector setting items 206 are items set by a plurality of inspector devices 14 which have evaluated the sample a. The address of the user is unique data (ID) for each user who makes a payment when the user registers an account in the inspection system 101.

Referring back to FIG. 15, the request processing unit 180 executes processing upon inspection request in response to a call from the requester device 12. The evaluation commit processing unit 182 executes processing at the time of evaluation commit in response to a call from the inspector device 14. The result commit processing unit 184 executes processing upon result commit in response to a call from the requester device 12.

The final commit processing unit 186 executes processing upon final commit in response to a call from the inspector device 14. The final commit processing unit 186 includes an inspector evaluation unit 188 and a token transfer unit 190. The inspector evaluation unit 188 adjusts the score of the inspector stored in the score storage unit 176 of the actor SC 110. The token transfer unit 190 transfers a token between the accounts stored in the token SC 108.

The viewing processing unit 192 executes processing at the time of viewing in response to a call from the viewer device 16. The requester evaluation processing unit 194 executes processing upon requester evaluation in response to a call from the viewer device 16.

The operation of the inspection system 101 having the above configuration will be described.

Figure 17:
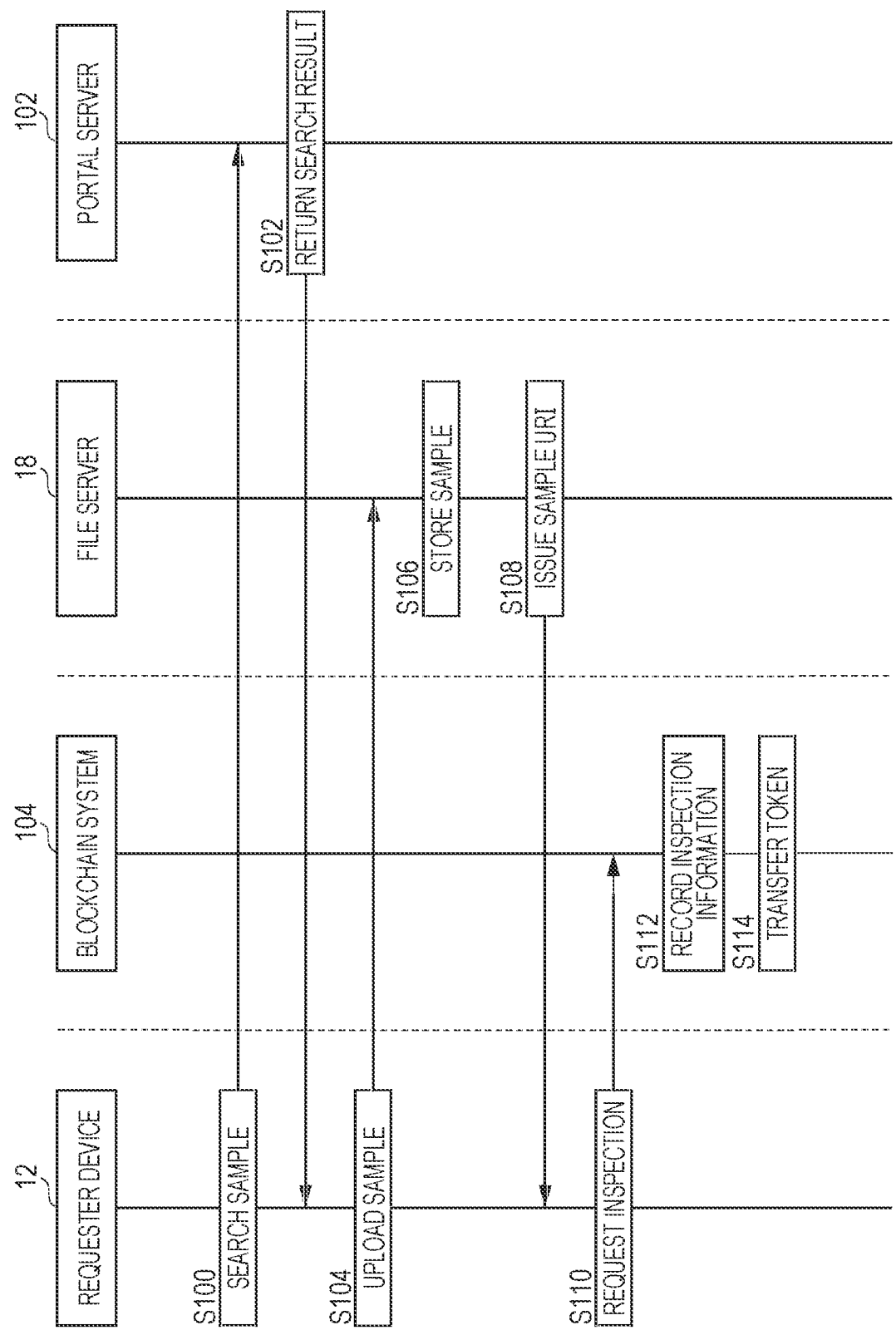
FIG. 17 is a flowchart illustrating operation related to requesting an inspection.

FIG. 17 is a flowchart illustrating operation related to an inspection request. The sample search unit 120 of the requester device 12 transmits, to the portal server 102, a request for sample search using a hash value of a sample of the inspection candidate designated by the requester as a key (S100). The portal server 102 searches for inspection information stored in the virus SC 106 using the hash value specified in the search request as a key. The portal server 102 transmits a search result indicating whether the sample corresponding to the hash value exists (that is, under inspection or inspection completed) or not (that is, not inspected) to the inspector device 14 (S102). The requester device 12 displays the search result on a screen.

In a case where the test candidate's sample has not been inspected, the requester inputs, to the requester device 12, an instruction operation to request an inspection of the sample. The sample registration unit 122 of the requester device 12 transmits a registration request including data of the sample itself to the file server 18 (S104). The file server 18 stores the data of the sample transmitted from the requester device 12 in a predetermined storage area (S106). The file server 18 issues a sample Uniform Resource Identifier (URI), which is a unique ID in the file server 18, for the stored sample, and transmits the sample URI to the requester device 12 (S108). The sample registration unit 122 of the requester device 12 acquires the sample URI transmitted from the file server 18.

The inspection request unit 124 of the requester device 12 activates an inspection request method of the virus SC 106 by using a plurality of pieces of attribute data related to the sample as parameters (S110). The plurality of pieces of attribute data related to the sample include a hash value of the sample, a requester address, a sample URI, an inspection deadline, and a reward amount (a token amount, in other words). The inspection deadline and the reward amount are arbitrarily determined by the requester. The request processing unit 180 of the virus SC 106 records the inspection information (requester setting item 200) including the plurality of pieces of attribute data in the inspection information storage unit 178 (S112). At this time, a status of the inspection information is set during the inspection.

Further, the request processing unit 180 of the virus SC 106 records account information (inspection request account) corresponding to the current inspection request in the request account storage unit 172 of the token SC 108.

The request processing unit 180 transfers the token of the reward amount, the token of the fee to the organizer, and the token of the deposit of the requester from the requester account of the token SC 108 to the inspection request account (S114). The virus SC 106 may cause the token SC 108 to execute token transfer processing by an external call. Also, the token SC 108 determines the amount of the fee to the organizer according to the requester score stored in the actor SC 110. According to the present embodiment, the higher the requester score, the lower the fee, and the lower the requester score, the higher the fee. This configuration gives the requester an incentive to increase the requester score.

Figure 18:
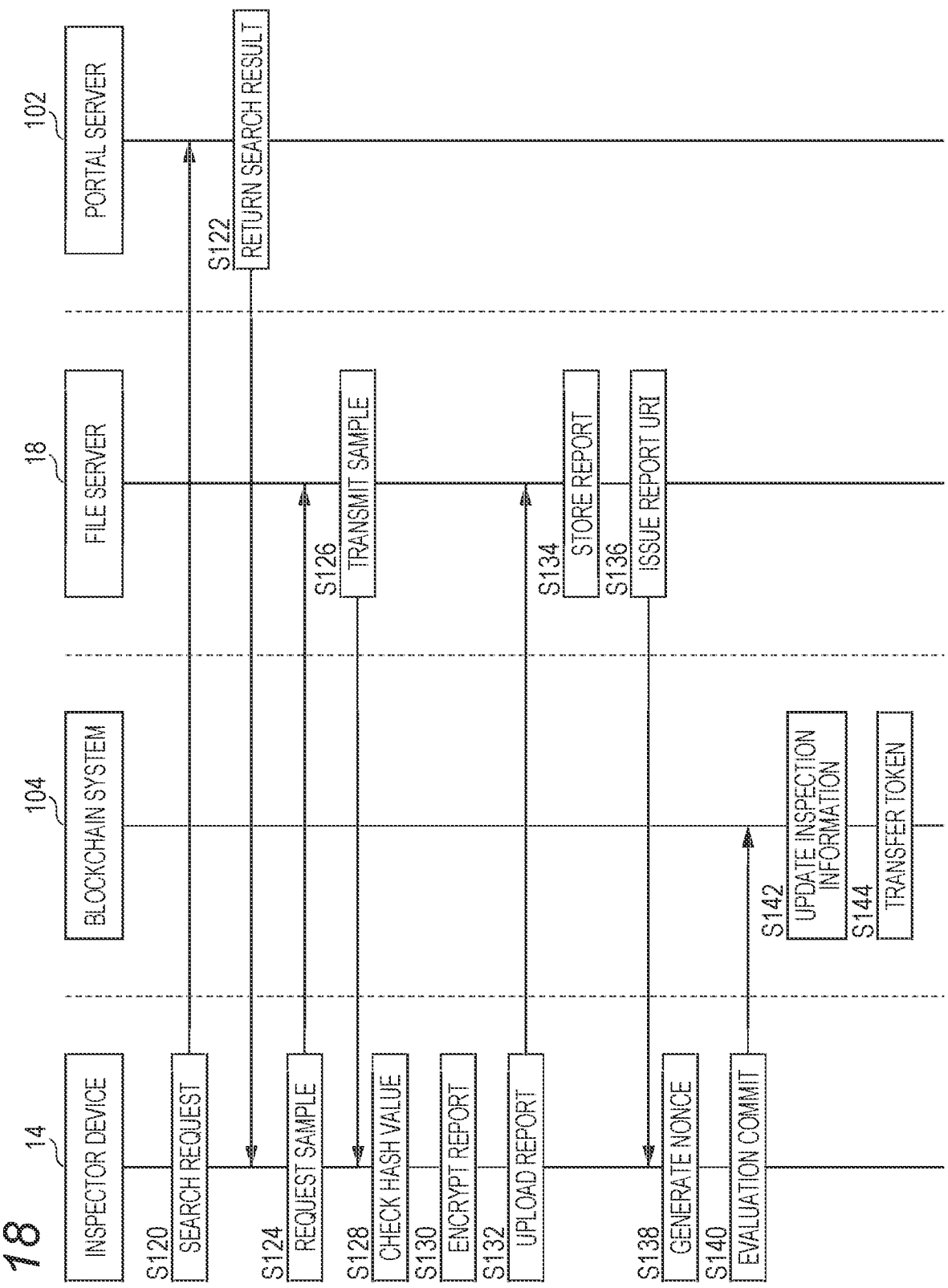
FIG. 18 is a flowchart illustrating operation related to executing an inspection.

FIG. 18 is a flowchart illustrating operation related to an execution of an inspection. The processes of FIG. 18 are executed by each of the plurality of inspector devices 14. The request search unit 140 of the inspector device 14 transmits a search request for an inspection request to the portal server 102 (S120). The portal server 102 refers to the inspection information of the virus SC 106, and transmits information on the inspection request whose status is under inspection as a search result to the inspector device 14 (S122). The information on the inspection request includes the sample hash value, the deadline, the reward, the number of inspectors who have completed the evaluation (the number of inspectors recorded in the inspection information), and the sample URI included in the inspection information of the virus SC 106, and further includes a requester score and the score of an evaluation completion inspector recorded in the actor SC 110. The inspector device 14 displays the search result on a screen.

The inspector confirms the search result, and determines the sample to be inspected by the inspector (hereinafter referred to as "target sample"). The sample acquisition unit 142 of the inspector device 14 downloads the target sample from the file server 18 based on the sample URI of the target sample (S124). The file server 18 transmits the data of the target sample to the inspector device 14 (S126). The sample check unit 144 of the inspector device 14 acquires the hash value of the data of the target sample acquired from the file server 18, and checks identity with the hash value of the target sample acquired from the portal server 102 (S128). With this configuration, it is confirmed that the data of the target sample acquired from the file server 18 is not tampered, which means the data is original data.

The inspector inspects whether the target sample is malware or not, and creates an evaluation report including at least data indicating whether the target sample is malware ("black") or not ("white"). When the inspector inputs an instruct operation of evaluation commit to the inspector device 14, the report registration unit 146 of the inspector device 14 encrypts the evaluation report with a public key of the requester (S130). The report registration unit 146 uploads an evaluation report to the file server 18 (S132). The file server 18 stores data of the evaluation report transmitted from the inspector device 14 in a predetermined storage area (S134). The file server 18 issues a report URI, which is a unique ID in the file server 18, of the stored evaluation report, and transmits the report URI to the inspector device 14 (S136). The report registration unit 146 of the inspector device 14 acquires the report URI.

The evaluation commit unit 148 of the inspector device 14 acquires a nonce generated by a predetermined random number generator (S138). The evaluation commit unit 148 activates an evaluation commit method of the virus SC 106 using a plurality of pieces of attribute data related to the evaluation as a parameter (S140). The plurality of pieces of attribute data related to the evaluation include a hash value of the evaluation report, a hash value of data acquired by combining a value indicating that the target sample is "white" or "black" with a nonce (also referred to as "evaluation hash value"), and the report URI. Since the hash value of the evaluation report is included, the inspector cannot deny that he/she has not created the evaluation report in the future.

The evaluation commit processing unit 182 of the virus SC 106 updates the inspection information based on the plurality of pieces of attribute data, and records, for example, the inspector setting item 204 or the inspector setting item 206 (S142). Here, the final commit flag of the inspector setting item is set to "uncommitted". Further, the evaluation commit processing unit 182 of the virus SC 106 transfers a predetermined amount of tokens from the inspector account of the token SC 108 to the inspection request account as a deposit of the inspector (S144).

Figure 19:
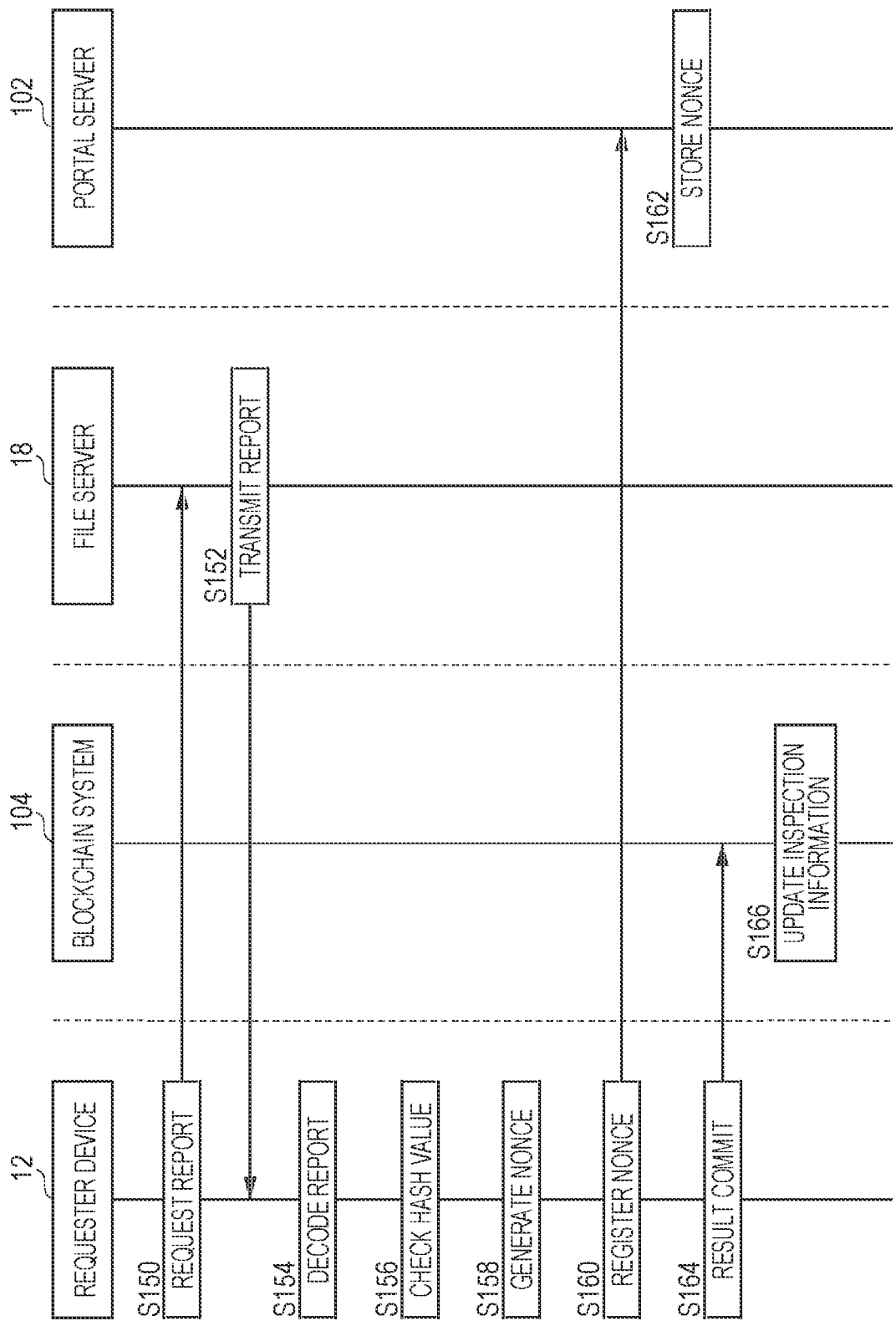
FIG. 19 is a flowchart illustrating operation by a requester related to judging a result.

FIG. 19 is a flowchart illustrating an operation related to result determination by the requester. When the time limit specified in the inspection request passes, the report acquisition unit 126 of the requester device 12 refers to the inspection information of the virus SC 106 to acquire a report URI associated with the sample (sample hash value) requested to be inspected. The report acquisition unit 126 requests the file server 18 for the evaluation report identified by the report URI (S150). The file server 18 transmits the data of the evaluation report requested from the requester device 12 to the requester device 12 (S152). The report acquisition unit 126 of the requester device 12 decodes the evaluation report using a private key of the requester (S154).

The report acquisition unit 126 inputs data of the decoded evaluation report into a hash function to acquire a hash value, and acquires a hash value of the evaluation report recorded in the inspection information of the virus SC 106. The report acquisition unit 126 confirms identity of the two hash values (S156). With this configuration, it is confirmed that the evaluation report has not been tampered. The requester device 12 repeats the processes of S150 to S156 by the number of inspectors who evaluated the sample, that is, the number of evaluation reports of the sample. The requester confirms content of one or more evaluation reports by one or more inspectors, and comprehensively judges whether or not the sample of the inspection request is malware (black or white, in other words). Hereinafter, this judgement is also referred to as "black-and-white judgement".

The requester inputs an instruction operation of a result commit to register the result of the black-and-white judgement to the inspector device 14. The nonce registration unit 128 of the inspector device 14 generates a result nonce to be added to the result of the black-and-white judgement (S158), and transmits the sample hash value and the result once to the portal server 102 (S160). The portal server 102 associates and stores the sample hash value and the result nonce (S162).

The result commit unit 130 of the requester device 12 activates a result commit method of the virus SC 106 by using a plurality of pieces of attribute data related to the black-and-white judgement result as a parameter (S164). A plurality of pieces of attribute data related to the black-and-white judgement result include a hash value of data obtained by combining a value indicating whether the sample is "black" or "white" and the result nonce (hereinafter, also referred to as "result hash value"), an arrangement of addresses of correct-result providers, and a viewing fee to view the black and white judgment result. The correct-result provider is an inspector whose evaluation result is determined to be correct by the requester or, in other words, an inspector who has made a same evaluation as the black-and-white judgement by the requester. Also, the viewing fee is arbitrarily determined by the requester. The result commit processing unit 184 of the virus SC 106 updates the inspection information based on the plurality of pieces of attribute data, and records, for example, the requester setting item 202 in FIG. 16 (S166).

Figure 20:
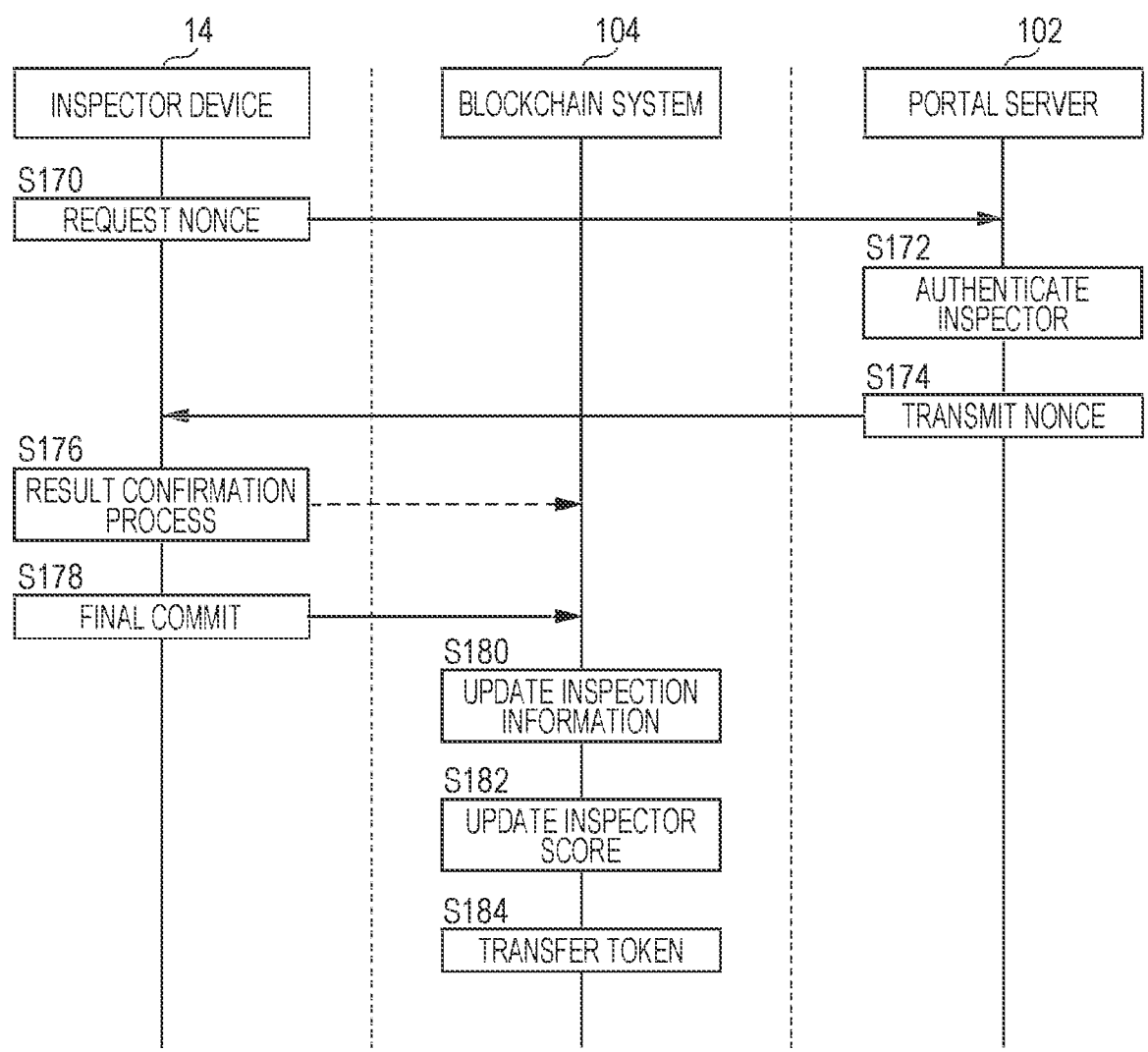
FIG. 20 is a flowchart illustrating operation by an inspector related to a final commit.

FIG. 20 is a flowchart illustrating operation related to the final commit by the inspector. The final commit can be referred to as an approval of the black-and-white judgement result by the requester. The nonce acquisition unit 150 of the inspector device 14 requests the portal server 102 for a result nonce using the hash value of the sample evaluated by the inspector as a key (S170). The portal server 102 permits provision of the result nonce when the inspector of the result nonce request source is recorded in the inspection information of the virus SC 106 having the sample hash value as a key or, in other words, when the inspector is a legitimate inspector (S172). The portal server 102 transmits the result nonce to the inspector device 14 of the valid inspector (S174). The nonce acquisition unit 150 of the inspector device 14 acquires the result nonce.

The result confirmation unit 152 of the inspector device 14 acquires the result hash value from the inspection information of the virus SC 106. The result confirmation unit 152 determines whether the black-and-white judgement result by the requester is "black" or "white" by comparing the hash value of data obtained by combining the result nonce with a predetermined "white" value, a hash value of data obtained by combining the result nonce with a predetermined "black" value, and a result hash value (S176). In other words, when the hash value of the data obtained by combining the result nonce with the predetermined "white" value matches the result hash value, the result confirmation unit 152 identifies that the requester has determined "white". Further, when the hash value of the data obtained by combining the result nonce with the predetermined "black" value matches the result hash value, the result confirmation unit 152 identifies that the requester has determined "black".

The result confirmation unit 152 may display on the screen whether the requester has determined that the sample is valid ("white") or malware ("black"). Further, in S176, the result confirmation unit 152 acquires the arrangement of the correct-result provider addresses from the inspection information of the virus SC 106, and displays the arrangement on the screen. The result confirmation unit 152 may display on the screen whether or not the address of the inspector of the inspector device 14 is included in the arrangement of the correct-result provider addresses.

When the black-and-white judgement result by the requester is the same as the inspector's evaluation result or when the inspector is a correct-result provider, the inspector confirms that his/her address is included in the arrangement of the correct-result provider addresses. In the case of approving the black-and-white judgement result by the requester and the recognition of the correct-result providers, the inspector inputs an instruction operation of the final commit to the inspector device 14. The final commit unit 154 of the inspector device 14 activates a final commit method of the virus SC 106 using a parameter including the sample hash value and the inspector address (S178).

The final commit processing unit 186 of the virus SC 106 updates the inspection information based on the parameter transmitted from the inspector device 14 (S180). For example, the final commit processing unit 186 changes the final commit flag of the inspector setting item to "committed".

The inspector evaluation unit 188 of the final commit processing unit 186 refers to the correct-result provider address in the inspection information and, based on whether the inspector (also referred to as a "target inspector") who made the final commit is a correct-result provider or not, the score of the target inspector is adjusted (S182). For example, when the target inspector is the correct-result provider, the inspector evaluation unit 188 modifies the score of the target inspector recorded in the actor SC 110 to a greater value. In addition, when the target inspector is not a correct-result provider, the inspector evaluation unit 188 modifies the score of the target inspector to a smaller value. The virus SC 106 may update the score recorded in the actor SC 110 by an external call.

The token transfer unit 190 of the final commit processing unit 186 transfers the deposit of the inspector recorded in the inspection request account to the account of the inspector based on the inspector address transmitted from the inspector device 14 (S184). In other words, the token transfer unit 190 refunds the token deposited from the inspector at the time of registration of the evaluation report to the account of the inspector at the time of final commit.

Here, the token transfer unit 190 further performs following processes at a final commit by the last inspector in a case where there are more than one inspector for one sample, or at the final commit by one inspector in a case where there is a single inspector. (1) The token transfer unit 190 distributes a reward to the inspector who has been identified as the correct-result provider. In this case, the token transfer unit 190 refers to the actor SC 110 to refer to the score of each correct-result provider, and assigns a relatively large reward to the inspector having a relatively high score. (2) The token transfer unit 190 transfers the fee recorded in the inspection request account to the organizer account.

The token transfer unit 190 transfers the deposit of the requester recorded in the inspection request account to the requester account. In other words, the token transfer unit 190 refunds the token deposited from the requester at the time of the inspection request to the account of the requester. In addition, the final commit processing unit 186 updates a status in the requester setting item to "inspection completed". When all the final commit flags in one or more inspector setting items recorded in the inspection information of a certain sample become committed, the final commit processing unit 186 determines that all the inspectors of the sample have performed the final commit.

Figure 21:
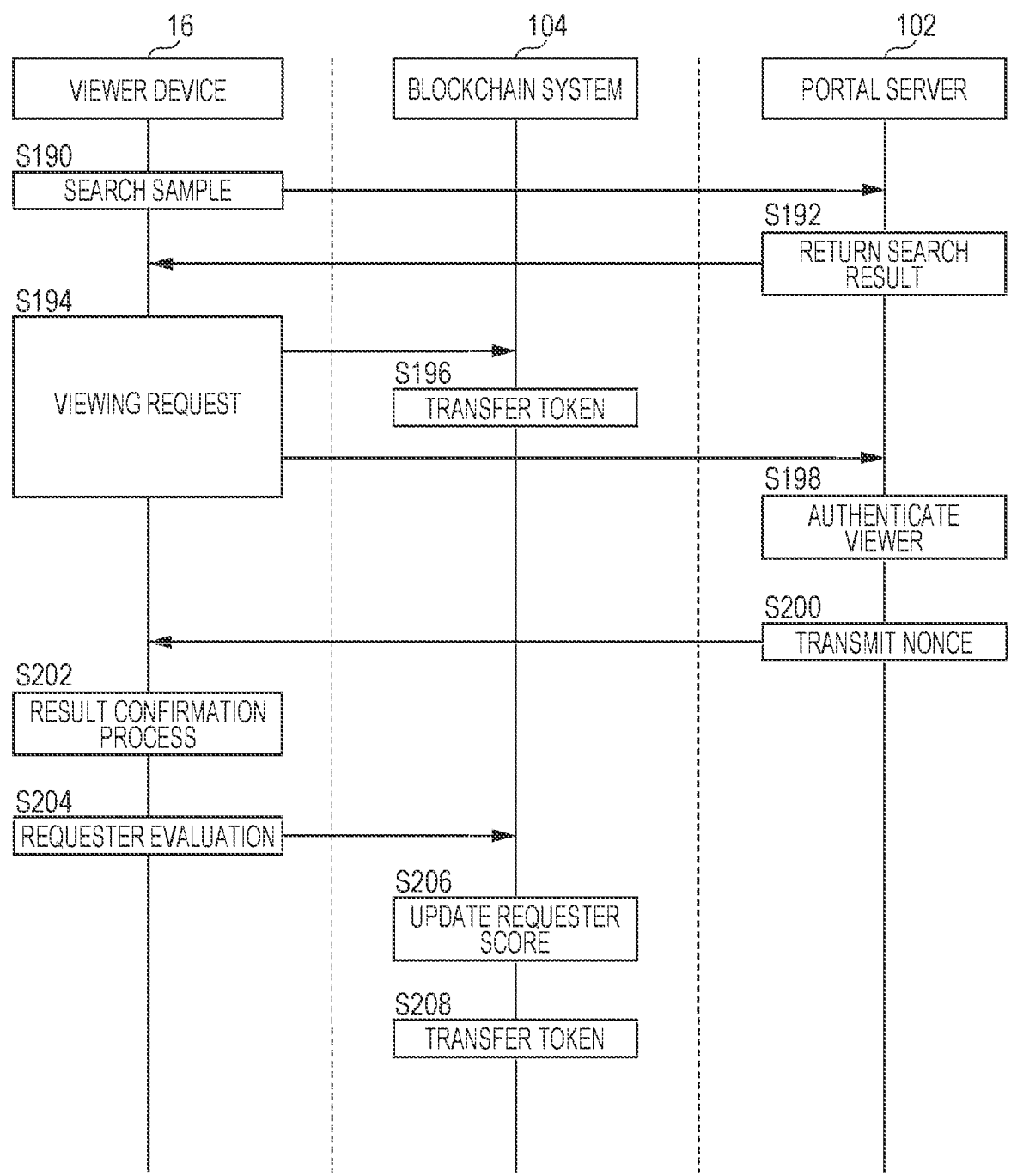
FIG. 21 is a flowchart illustrating operation when viewing an inspection result.

FIG. 21 is a flowchart illustrating an operation when the inspection result is viewed. The sample search unit 160 of the viewer device 16 transmits a search request for a sample as a viewing candidate to the portal server 102 (S190). The portal server 102 transmits the search result including the sample information in a completion status to the viewer device 16 (S192). The above sample information includes the sample hash value, the status, the viewing fee, a requester addresses, one or more inspector addresses, and one or more correct-result provider addresses, which are included in the inspection information of the virus SC 106. Furthermore, the requester score and the inspector score recorded in the actor SC 110 are included.

The viewing execution unit 162 of the viewer device 16 activates a viewing processing method of the virus SC 106 using a parameter including a sample address and a viewer address (S194). The viewing processing unit 192 of the virus SC 106 transfers a token for the viewing fee from the viewer account to the requester account in the token SC 108. Further, the viewing processing unit 192 transfers a token for a predetermined fee from the viewer account to the organizer account. In addition, the viewing processing unit 192 records the current account for viewing in the token SC 108, and transfers a predetermined amount of tokens from the viewer account to the current account for viewing as a deposit for the viewer (S196).

Also, in S194, the viewing execution unit 162 of the viewer device 16 transmits a viewing request including the sample address and the viewer address to the portal server 102. The portal server 102 uses the viewer address to confirm that the viewer has paid the viewing fee (S198). When the viewer has paid the viewing fee, the portal server 102 transmits the result nonce associated with the sample address (the result nonce stored in S162) to the viewer device 16 (S200). The viewing execution unit 162 of the viewer device 16 acquires the result nonce.

The viewing execution unit 162 of the viewer device 16 acquires the result hash value of the viewing target sample from the inspection information of the virus SC 106. The viewing execution unit 162 judges whether the black-and-white judgement result for the sample to be viewed is "white" or "black," by comparing a hash value of data obtained by combining the result nonce with a predetermined value of "white", a hash value of data obtained by combining the result nonce with a predetermined value of "black", and a result hash (S202). The black-and-white judgement result here is a final determination result by the requester of the sample as a viewing target. The viewing execution unit 162 may display on the screen whether the black-and-white judgement result of the sample as a viewing target is "white" or "black".

After confirming the black-and-white judgement result, the viewer evaluates the requester and inputs the evaluation result to the viewer device 16. Typically, the viewer sets a high evaluation value when the black-and-white judgement result by the requester is correct, while the viewer sets a low evaluation value when the black-and-white judgement result by the requester is incorrect. The case that the black-and-white judgement result of the requester is incorrect is, for example, a case that the viewing target sample is actually found to be malware ("black") even though the requester has judged that the viewing target sample is legitimate ("white") or conversely, a case that the viewing target sample is actually found to be legitimate ("white") even though the requester has judged that the viewing target sample is malware ("black"). The requester evaluation unit 164 of the viewer device 16 activates a requester evaluation method of the virus SC 106 using the viewer address and the evaluation value of the requester as parameters (S204).

The requester evaluation processing unit 194 of the virus SC 106 adjusts the requester score based on the requester evaluation value transmitted from the viewer device 16 (S206). For example, when the requester evaluation value is high, the requester evaluation processing unit 194 may modify the requester score recorded in the actor SC 110 to a higher value. Conversely, when the requester evaluation value is low, the requester evaluation processing unit 194 may modify the requester score recorded in the actor SC 110 to a smaller value. Further, the requester evaluation processing unit 194 transfers the depositor of the viewer recorded in the viewing account to the viewer account (S208). In other words, the requester evaluation processing unit 194 refunds the token deposited from the viewer at the time of viewing execution to the viewer account at the time of requester evaluation.

The present invention has been described above based on the second embodiment. It is understood by those skilled in the art that this second embodiment is an exemplification, and that various modifications can be made to the combination of each component and each processing process, and such modifications are also within the scope of the present invention.

Figure 22:
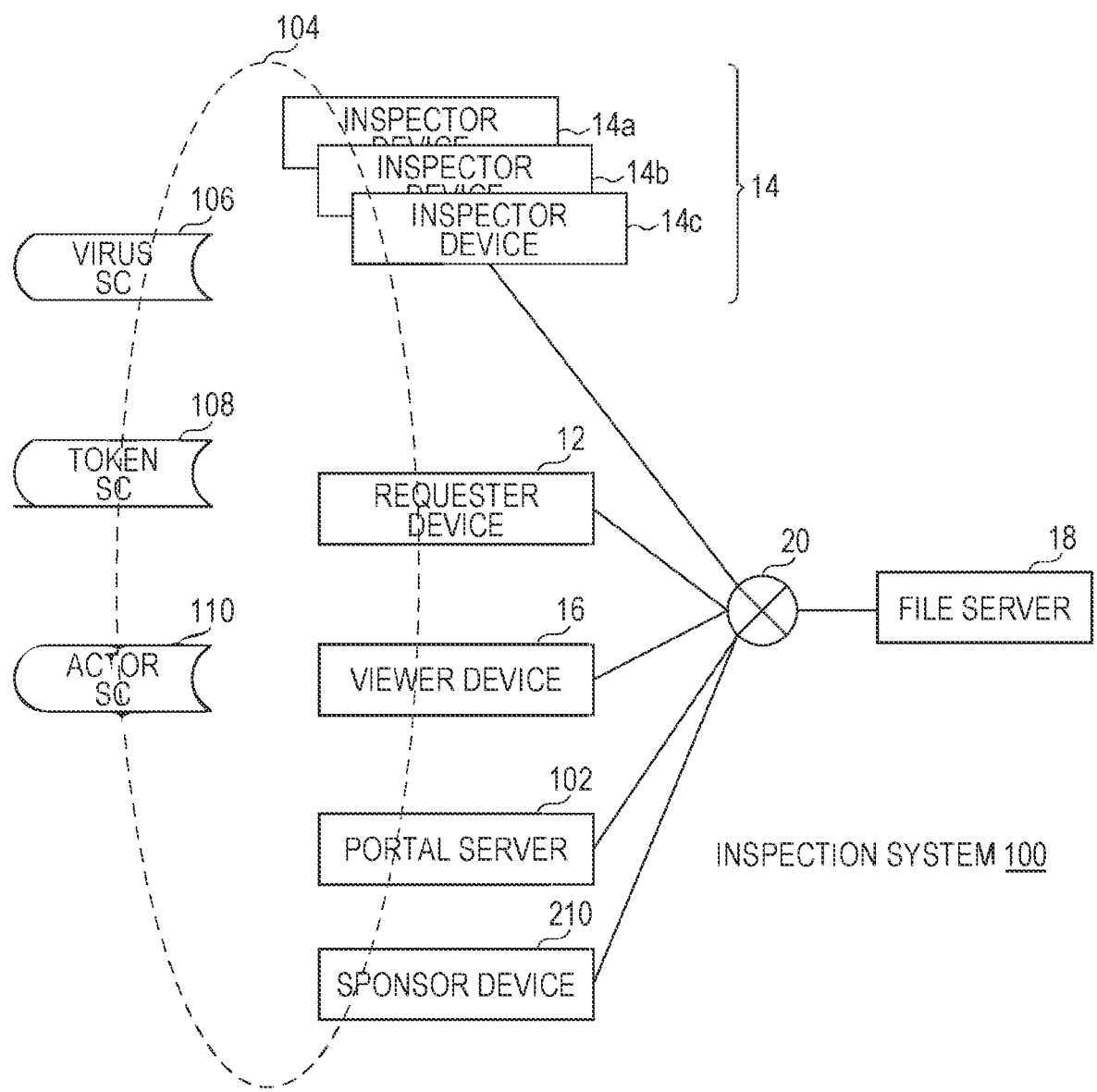
FIG. 22 is a diagram illustrating a configuration of the inspection system according to a modification.

A modified example will be described. Although not mentioned in the second embodiment, the inspection system 101 may have a mechanism in which another person can support the inspection request registered by a certain requester. FIG. 22 illustrates a configuration of an inspection system 101 according to the modification. The inspection system 101 includes a sponsor device 210 in addition to the configuration of the second embodiment. The sponsor device 210 is an information processing device operated by a sponsor. The sponsor is a user who sponsors the inspection of the sample registered by a requester or, in other words, a user who requests the inspection of the same sample with the requester. The sponsor for the inspection of a certain sample may be a requester, an inspector, or a viewer in an inspection of another sample.

Figure 23:
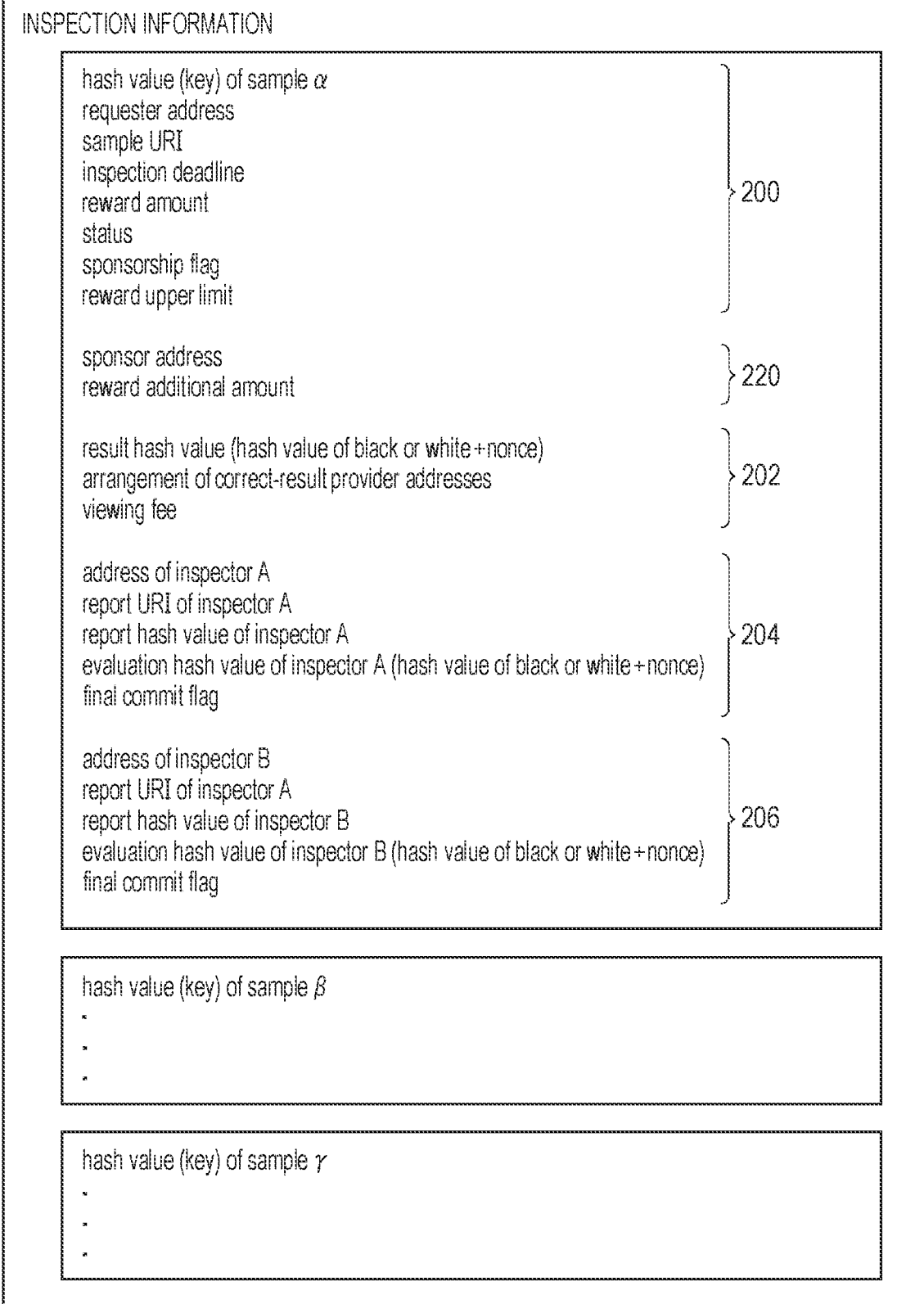
FIG. 23 is a diagram illustrating an example of inspection information according to a modification.

FIG. 23 illustrates an example of the inspection information according to the modification. According to the present modification, the requester device 12 and the virus SC 106 further set a sponsorship flag and a reward upper limit when registering an inspection request. The sponsorship flag is set to either permit the sponsorship of another party ("sponsoring") or prohibit the sponsorship of the other person ("no sponsoring"). The reward upper limit is set when the sponsorship flag indicates sponsoring. The reward upper limit is an upper limit of the reward amount added by the sponsor.

The purpose of the sponsor to sponsor the sample inspection is to raise the reward amount to improve the inspector's motivation, to encourage active evaluation, and to receive the distribution of the viewing fee. When all the inspectors have made a final commit, the token transfer unit 190 of the virus SC 106 distributes the sum of the requester reward amount and the sponsor's additional amount to one or more correct-result providers. In addition, the token transfer unit 190 distributes the viewing fee paid by the viewer between the requester and the sponsor according to a reward sharing ratio. For example, when the requester reward amount is 80 tokens, the sponsor's additional amount is 20 tokens, and the viewing fee is 10 tokens, the token transfer unit 190 may transfer 8 tokens from the viewer account to the requester account and transfer 2 tokens from the viewer account to the sponsor account.

In the above example, when there is no sponsor, the requester can receive 10 tokens per view, but since there is a sponsor, the revenue per view becomes 8 tokens. Also, the viewing fee needs to be about 13 tokens in order to provide the viewer 10 tokens per view; however, this may cause a reduction of the number of viewers. The setting items for adjusting such a decrease in revenue are the sponsorship flag and the reward upper limit. For example, the requester can arbitrarily adjust the revenue per viewing by adjusting the reward amount, the reward upper limit, and the viewing fee. The requester compares and balances inspection activeness and his/her revenue, and sets the sponsorship flag and the reward upper limit.

Figure 24:
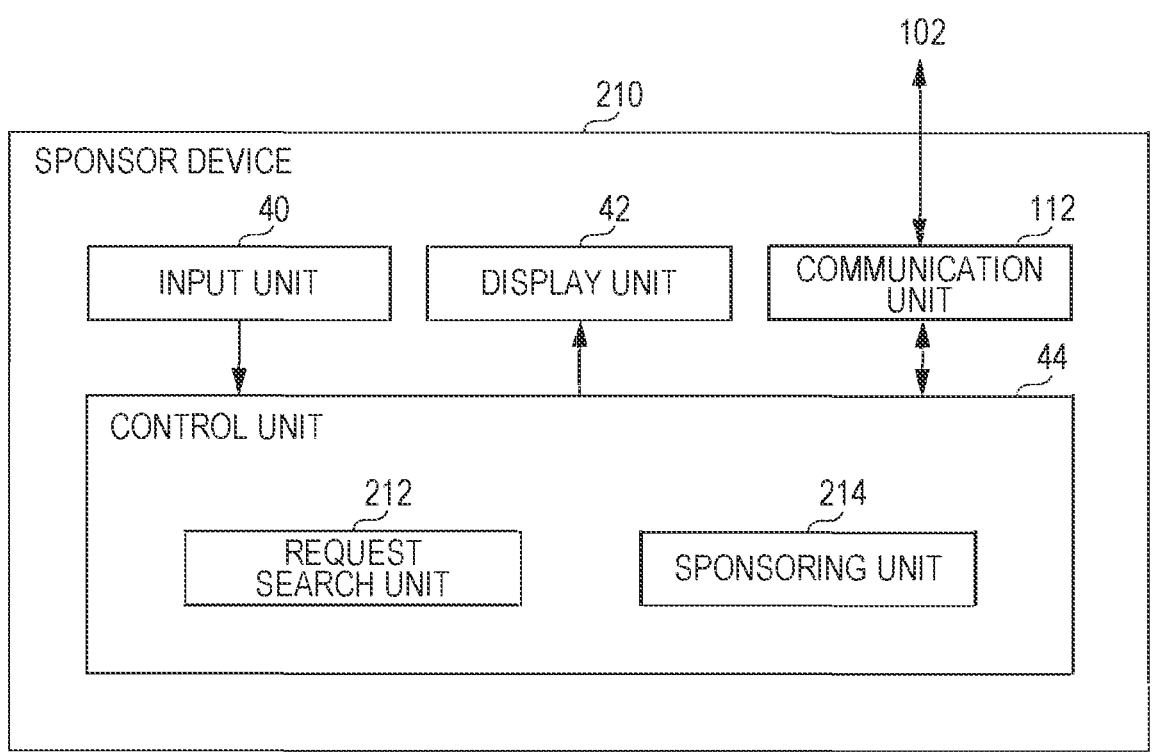
FIG. 24 is a block diagram illustrating functional blocks of a sponsor device of FIG. 22

FIG. 24 is a block diagram illustrating functional blocks of the sponsor device 210 of FIG. 22. The sponsor device 210 includes a requester device 12, a display unit 42, a communication unit 112, and a control unit 44. The control unit 44 includes a request search unit 212 and a sponsoring unit 214.

The request search unit 212 acquires information on the one or more registered inspection requests from the portal server 102. For example, the request search unit 212 transmits a search request for an inspection request to the portal server 102. The portal server 102 refers to the inspection information of the virus SC 106, and transmits information on the inspection request whose status is under inspection as a search result to the sponsor device 210. The information on the inspection request includes the sample hash value, the deadline, the reward, the number of inspectors who have completed evaluation (the number of inspectors recorded in the inspection information), and the sample URI included in the inspection information of the virus SC 106. Furthermore, the requester score recorded in the actor SC 110 and the score of the evaluation completion inspector are included. The portal server 102 may transmit, to the sponsor device 210, only the information of the inspection request for which the sponsorship flag is set as the sponsoring is available. The sponsor device 210 displays the search result on a screen.

The sponsoring unit 214 activates the sponsoring processing method of the virus SC 106 using a parameter specifying the inspection request selected as the sponsoring target by the sponsor. The above parameter includes a sample hash value which is a key of the inspection request to be sponsored and a reward addition amount (an addition amount to a predetermined reward, in other words). The sponsor processing unit (not illustrated) of the virus SC 106 updates the inspection information identified by the sample hash value using the above parameter. For example, the sponsor processing unit of the virus SC 106 sets the sponsor setting item 220 in FIG. 23 as inspection information. In addition, since the sponsor does not need to commit the result, the deposit which is the incentive to commit the result is also unnecessary.

The configuration and operation of the inspection system 101 described in the second embodiment and the modification can be described as follows.

Item 1

The requester device 12 records inspection target data in a predetermined area, and records inspection reward to the blockchain system 104. Each of the one or more inspector devices 14 acquires inspection target data recorded by the requester device 12 and records an inspection result (for example, an evaluation report) of the inspection target data in the predetermined area. The requester device 12 acquires one or more inspection results recorded by the one or more inspector devices 14, and records data of a correct-result provider who is an inspector whose inspection result is determined to be correct by the requester (for example, an arrangement of correct-result provider addresses) in the blockchain system 104. The blockchain system 104 (the virus SC 106, for example) distributes the inspection reward to the correct-result provider.

With this configuration, the requester can obtain the inspection result of the electronic data by one or more inspectors, and a correct-result provider among the one or more inspectors can realize a business model to receive a reward. In addition, by using the blockchain system for reward payment, the requester can easily make a remittance (in other words, transfer of value) even when he/she does not have the credibility to each inspector. In addition, repetition of small-amount remittances can be easily realized. Further, tampering of the reward payment can be prevented.

Item 2

The blockchain system 104 (the actor SC 110, for example) stores the score of each of one or more inspectors. The score of each inspector is modified depending on whether or not the inspection result is correct (whether the evaluation result is white or black, for example). The blockchain system 104 distributes a relatively high reward to the inspector whose score is relatively high among the one or more inspectors whose inspection results are determined to be correct.

This configuration can provide the inspector with an incentive to create a correct evaluation result or, in other words, to make an evaluation in good faith.

Item 3

Each of the one or more inspector devices 14 acquires the data of the correct-result provider from the blockchain system 104, and records, in the blockchain system 104, an approval of the correct-result provider when the data of the correct-result provider is approved by the inspector (for example, the final commit). The blockchain system 104 distributes the inspection reward to the correct-result provider when all the inspector devices 14 record approval of the correct-result provider.

With this configuration, the reward is distributed to the correct-result provider on condition that the judgement of the correct-result provider by the requester is approved by all the inspectors corresponding to the inspection request of the requester. As a result, it is possible to realize a reward distribution that is satisfactory for each inspector.

Item 4

When recording the inspection target data (for example, at the time of inspection request), the requester device 12 records at least a part of currency (for example, a token) owned by the requester as a deposit to the blockchain system 104 (the token SC 108, for example). The blockchain system 104 refunds the deposit to the requester when all the inspector devices 14 record approvals of the correct-result provider.

With this configuration, by refunding the deposit to the requester on condition of the approval of all the inspectors corresponding to the inspection request of the requester, an incentive to respond genuinely to the opposition from the inspector is given to the requester. For example, even if an inspector, who has made a correct evaluation result (matches with the black-and-white judgement result of the requester), is not included in the correct-result providers approved by the requester, the inspector makes an appeal to the requester. The requester who receives the appeal works to add the inspector in the arrangement of the correct-result provider addresses, or the like.

Item 5

Each of the one or more inspector devices 14 records at least a part of currency owned by the inspector as a deposit to the blockchain system 104 (the token SC 108, for example) when recording an inspection result (at the evaluation commit, for example). The blockchain system 104 refunds the deposit to the inspector of the inspector device 14 when the correct-result provider approval has been recorded from the inspector device 14.

An inspector whose result is determined to be incorrect may not try to approve the judgement of the correct-result providers by the requester; however, since the deposit is refund on condition of the approval, this may provide an incentive to the inspector to approve the requester judgement of the correct-result providers. With this configuration, the score of the inspector can be adjusted and the reward can be distributed under the consent of all the inspectors.

Item 6

Each of the one or more inspector devices 14 records, in the blockchain system 104, the hash value (the evaluation hash value of FIG. 16, for example) of the data obtained by combining the inspection result and the random number value when recording the inspection result (the black-and-white judgement result, for example).

With this configuration, the one or more inspector devices 14 can prove their own evaluation results later by storing each random number value, and prevent the inspection result from being tampered by recording the hash value in the blockchain system 104.

Item 7

The requester device 12 records the inspection result (the black-and-white judgement result, for example) and the viewing fee for the inspection result in the blockchain system 104 (the virus SC 106, for example). The viewer device 16 causes the blockchain system 104 to execute processing for paying the requester a viewing fee from the currency owned by the viewer.

Since the requester can make a profit by having the inspection results viewed, the requester can be provided with an incentive for requesting the inspection. In addition, the payment of viewing fee can be prevented from tampering.

Item 8

The requester device 12 records the hash value of data obtained by combining the inspection result and the random number (the result hash value of FIG. 16, for example) in the blockchain system 104 (the virus SC 106, for example) and notifies the portal server 102 of the random number. When the viewing fee is paid from the viewer to the requester, the portal server 102 notifies the viewer device 16 of the random number so that the viewer device 16 can identify the inspection result.

Since the smart contract of the blockchain system 104 is shared by each device in the inspection system 101, each device of the inspection system 101 can acquire the data of the inspection result from the smart contract. However, when the above configuration is employed, it is possible to prevent the inspection result (whether the sample is white or black, in other words) from being confirmed without paying the viewing fee.

Item 9

When recording the inspection target data, the requester device 12 records at least a part of currency owned by the requester in the blockchain system 104 as a fee. The blockchain system 104 stores the requester score and determines the fee according to the requester score. The viewer device 16 adjusts the requester score stored in the blockchain system 104 by recording the requester evaluation input by the viewer in the blockchain system 104.

According to this configuration, it is possible to give the requester an incentive to try to improve his/her score to lower the fee or, in other words, to give the requester an incentive to properly make the black or white judgement of the sample.

Item 10

When acquiring the inspection result, the viewer device 16 records at least a part of currency owned by the viewer as a deposit to the blockchain system 104. The blockchain system 104 refunds the deposit to the viewer when a requester evaluation is recorded by the inspector device 14.

With this configuration, it is possible to provide the viewer with an incentive to evaluate the requester.

Item 11

The sponsor device 210 records the additional amount of inspection reward in the blockchain system 104 (the virus SC 106, for example). The blockchain system 104 distributes the reward including the additional amount to the correct-result provider among the inspectors who performed the inspection.

With this configuration, by providing a mechanism for adding the reward amount, the inspector can be motivated and the inspections are actively performed.

Item 12

The requester device 12 records the upper limit of the reward in the blockchain system 104 when recording the inspection target data. The additional amount of the reward by the sponsor device 210 is limited by the upper limit. The blockchain system 104 distributes the viewing fee paid by the viewer between the requester and the sponsor according to the reward sharing ratio.

With this configuration, the requester can arbitrarily adjust the share of the viewing fee or, in other words, the distribution ratio of the viewing fee with the sponsor, by setting the upper limit of the reward.

Item 13

The inspection system 101 may be configured without the requester device 12 or, in other words, may be configured with only the plurality of inspector devices 14 and the viewer device 16. In this configuration, the inspector may monitor the inspection target such as communication data (data such as a packet, for example) on a daily or periodic basis. For example, the inspector may extract and rule out unauthorized data communication and unauthorized access, which are patterns different from a predetermined pattern or policy, or may define an abnormal pattern in other words. The inspector device 14 may record the rule (the abnormal pattern, in other words) as a signature in the evaluation report, and may register the information sharing offer including the evaluation report and the reward amount necessary for viewing in the blockchain system 104. In other words, without receiving a request, the inspector may voluntarily perform the search and register an evaluation report including the inspection result and the countermeasure method in the blockchain system 104. The viewer browses an information sharing offer and pays the reward amount set by the inspector by the same mechanism as the second embodiment. When the content of the viewed signature is valid, the viewer may give the inspector a positive evaluation or pay an additional reward. When the viewed signature is not valid, the viewer may give the inspector a negative evaluation, or the viewing fee paid by the viewer may be collected by the organizer. Here, in this configuration, the sponsor device 210 may be added.

According to the configuration of item 13, without an inspection request from the requester, the inspector may independently inspect the illegitimate sample, security defects, and the like, to make the information public for a fee, or create a signature for detecting an unauthorized access as described above to provide information for a fee. The viewers (a security software provider, for example) can efficiently take a security measure. In addition, since the reward is given, it is expected that the inspector will be more motivated to monitor the detection of illegitimate data or information access.

Combinations of any of the embodiments and variations described above are also useful as embodiments of the present invention. The new embodiments resulting from the combination combine the effects of each of the combined embodiments and variations. Further, it is understood by those skilled in the art that the functions to be performed by the respective constituent elements described in the claims can be realized by a single element or a combination of the respective constituent elements described in the embodiments and the modifications.

INDUSTRIAL APPLICABILITY

The present invention is applicable to a system for inspecting electronic data

The invention claimed is:

1. A requester device comprising:
a processor configured to:
request inspection of electronic data by at least one inspection device;
record attribute information related to the electronic data, including at least one of an address of the electronic data or a hash value of the electronic data, in a blockchain network; and
record the electronic data in a predetermined area for retrieval by the at least one inspection device, wherein the predetermined area is outside the blockchain network.

2. The requester device according to claim 1, wherein the processor is configured to:
generate a smart contract including the attribute information.

3. The requester device according to claim 1, wherein the processor is configured to:
provide a score regarding the at least one inspection device dependent upon an inspection result received from the at least one inspection device.

4. The requester device according to claim 1, wherein the blockchain network is an Ethereum blockchain network.

5. The requester device according to claim 1, wherein the processor is configured to:
record, as part of the attribute information, a deadline associated with the request for inspection of the electronic data by the at least one inspection device.

6. The requester device according to claim 1, wherein the processor is configured to:
receive at least one inspection result of the at least one inspection device.

7. The requester device according to claim 6, wherein the processor is configured to:
receive the at least one inspection result recorded in the blockchain network by the at least one inspection device.

8. The requester device according to claim 1,
wherein the processor is configured to:
determine a correct result of whether the electronic data is illegitimate or not based, at least in part, on a plurality of inspection results.

9. The requester device according to claim 1, wherein a reward amount is distributed by the blockchain network.

10. An inspection device comprising:
a processor configured to:
retrieve, from a blockchain network, attribute information relating to a request for inspection of electronic data;
acquire the electronic data from a predetermined area indicated by the attribute information, wherein the predetermined area is outside the blockchain network;
determine an inspection result comprising an indication of whether the electronic data is illegitimate; and
record data relating to the determined inspection result in the blockchain network.

11. The inspection device according to claim 10, wherein the attribute information comprises a hash value of the electronic data.

12. The inspection device according to claim 10, wherein the blockchain network is an Ethereum blockchain network.

13. The inspection device according to claim 10, wherein the processor is configured to:
   receive a reward via the blockchain network in response to the inspection result being at least one of determined as a correct result or viewed.

14. The inspection device according to claim 10, wherein the processor is configured to:
   record the inspection result in a predetermined area, wherein the predetermined area is outside the blockchain network.

15. A method comprising:
   requesting, by a requester device, inspection of electronic data by an inspection device;
   recording, by the requester device, attribute information related to the electronic data, including at least one of an address of the electronic data or a hash value of the electronic data, in a blockchain network; and
   recording, by the requester device, the electronic data in a predetermined area for retrieval by the inspection device, wherein the predetermined area is outside the blockchain network.

16. The method of claim 15, comprising:
   retrieving, by the inspection device from the blockchain network, the attribute information;
   acquiring, by the inspection device, the electronic data from the predetermined area outside the blockchain network;
   determining, by the inspection device, an inspection result of whether the electronic data is illegitimate or not; and
   recording, by the inspection device in the blockchain network, data relating to the determined inspection result.

* * * * *